United States Patent
Ropos

(10) Patent No.: US 6,367,359 B1
(45) Date of Patent: Apr. 9, 2002

(54) BORING AND CONTOURING APPARATUS

(76) Inventor: Ronald P. Ropos, 6850 Camelot Dr., Mentor, OH (US) 44060

( * ) Notice: Subject to any disclaimer, the term of this patent is extended or adjusted under 35 U.S.C. 154(b) by 0 days.

(21) Appl. No.: 09/444,355

(22) Filed: Nov. 18, 1999

Related U.S. Application Data

(60) Provisional application No. 60/108,913, filed on Nov. 18, 1998.

(51) Int. Cl.[7] .......................... B23B 25/06; B23B 27/00
(52) U.S. Cl. ............... 82/1.4; 82/118; 82/133; 82/147
(58) Field of Search ............... 82/118, 133, 84, 82/134, 147, 903, 129, 1.2, 1.4

(56) References Cited

U.S. PATENT DOCUMENTS

| | | | |
|---|---|---|---|
| 3,311,003 A | 3/1967 | Daugherty | 82/2 |
| 3,592,553 A | * 7/1971 | Heizer | 408/124 |
| 3,710,659 A | 1/1973 | Pagella et al. | 82/1.2 |
| 3,744,352 A | 7/1973 | Scholl | 82/1.2 |
| 3,802,304 A | 4/1974 | Rogers | |
| 4,040,315 A | 8/1977 | Bellingham | |
| 4,055,787 A | 10/1977 | Beadle et al. | 318/591 |
| 4,250,775 A | * 2/1981 | Jerue et al. | 82/1.11 |
| 4,262,336 A | 4/1981 | Pritchard | 364/474 |
| 4,328,722 A | 5/1982 | Wohlhaupter et al. | |
| 4,354,305 A | 10/1982 | Plummer et al. | 29/568 |
| 4,400,118 A | * 8/1983 | Yamakage et al. | 82/1.2 X |
| 4,432,258 A | 2/1984 | Currer | 82/1.2 |
| 4,489,629 A | 12/1984 | D'Andrea et al. | 82/1.2 |
| 4,509,236 A | 4/1985 | Morita et al. | 29/26 A |
| 4,516,889 A | 5/1985 | Ortlieb | 408/152 |
| 4,551,044 A | 11/1985 | Schultshick | 408/185 |
| 4,552,493 A | 11/1985 | Schultshick | 408/3 |
| 4,564,914 A | * 1/1986 | Ballough et al. | 700/163 |
| 4,577,535 A | 3/1986 | Klabunde et al. | |
| 4,581,808 A | 4/1986 | Lawson et al. | 29/558 |

(List continued on next page.)

OTHER PUBLICATIONS

Komet of America, Inc., "Komet MO42 Electronic Compensating System for Precision Boring," Dated May 1997, 6 pages.

Kennametal Inc., "Ucenter Boring Heads Technical Manual," Dated Mar. 1990, 40 pages.

Primary Examiner—Henry Tsai
(74) Attorney, Agent, or Firm—David A. Burge

(57) ABSTRACT

A tool head or "head assembly" having on-board logic (1) for being mounted on a rotatable spindle of a machining center, as a boring machine, (2) for being rotated about a primary axis of spindle rotation (PRA), and (3) supports a tool as a boring bar at a controllable radial offset distance (ROD) from the PRA. The PRA aligns with the axis of a workpiece bore being formed The head advances along the PRA and rotates in a boring operation. As the head advances, the ROD of the tool is controlled by a micro-controller and secondary logic on-board the head cooperating with primary logic in a remote controller to provide a complex multi-diameter workpiece bore configuration. Rotating head elements protectively surround the secondary logic and control elements that regulate the ROD and may compensate for vibration, wear, and backlash. The head is usable with spindles of diverse machine tools.

41 Claims, 13 Drawing Sheets

U.S. PATENT DOCUMENTS

| | | | |
|---|---|---|---|
| 4,599,769 A | 7/1986 | Latzko et al. | 29/26 A |
| 4,607,549 A | 8/1986 | Krempel | |
| 4,617,846 A | 10/1986 | Horsch | 82/1.2 |
| 4,637,285 A | 1/1987 | Mizoguchi | |
| 4,676,127 A | 6/1987 | Watanabe | 82/1.2 |
| 4,676,704 A | 6/1987 | Donnini et al. | 409/208 |
| 4,741,230 A | 5/1988 | Bohner et al. | 82/1.2 |
| 4,742,738 A | 5/1988 | Strand | |
| 4,762,037 A | 8/1988 | Stoffel | 82/2 |
| 4,869,127 A | 9/1989 | Ariyoshi | 74/675 |
| 4,884,481 A | 12/1989 | Strauss | 82/1.2 |
| 4,913,602 A | 4/1990 | Peter et al. | 408/147 |
| 4,933,868 A | 6/1990 | McMurtry | 364/474.02 |
| 4,941,104 A | 7/1990 | Teshima et al. | 364/474.3 |
| 4,982,633 A | 1/1991 | Jager | 82/123 |
| 5,012,710 A | 5/1991 | D'Andrea et al. | 82/1.2 |
| 5,197,361 A | 3/1993 | Carrier et al. | 82/1.2 |
| 5,251,511 A | 10/1993 | Muendlein et al. | 82/1.2 |
| 5,396,821 A | 3/1995 | Okumura et al. | 82/1.3 |
| 5,520,077 A | 5/1996 | Lindstrom | 82/1.5 |
| 5,960,687 A * | 10/1999 | Rohrberg | 82/1.2 |
| 6,158,311 A * | 12/2000 | Watkin et al. | 82/1.4 |

* cited by examiner

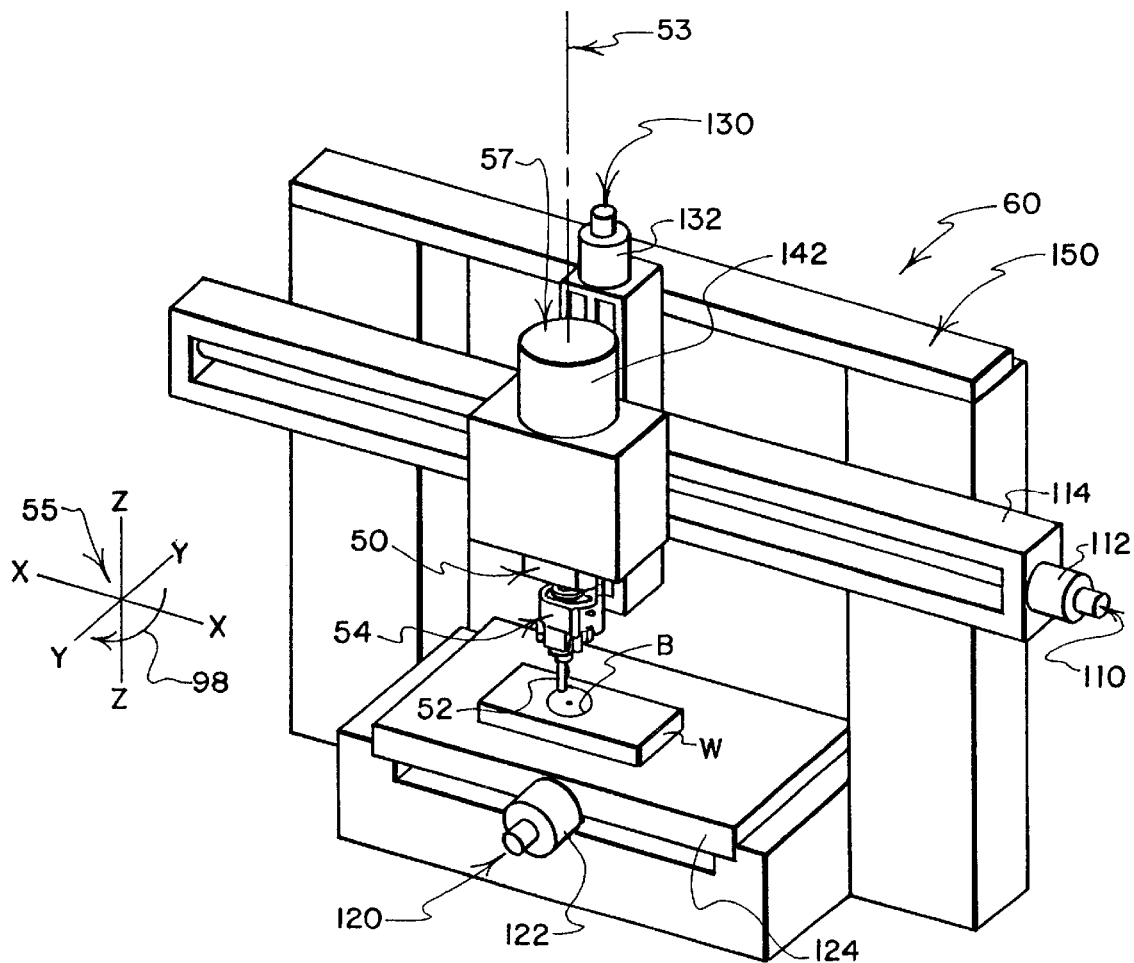
F I G. 1

BORING AND CONTOURING APPARATUS

REFERENCE TO PROVISIONAL APPLICATIONS

This application claims the benefit of U.S. Provisional Application Serial No. 60/108,913 filed Nov. 18, 1998, by Ronald P. Ropos entitled BORING AND CONTOURING APPARATUS, the disclosure of which is incorporated herein by reference.

BACKGROUND OF THE INVENTION

1. Field of the Invention

The present invention relates to the provision and use of a programmable boring and contouring apparatus or "head assembly" for performing three-dimensional machining operations such as boring, contouring, threading, turning, facing and the like, using a head assembly that is rotated about a primary rotation axis (PRA) of a machining center, wherein the head assembly has a radially movable tool holder for supporting a cutting tool at a radial offset distance (ROD) from the PRA which is controlled, at least in part, through the use of a micro-controller and a servo motor that are components of the head assembly itself. More particularly, the present invention relates to a boring and contouring apparatus or "head assembly" having on-board logic 1) for being mounted on the rotatable spindle of a machining center such as a boring machine, 2) for being rotated about a primary axis of rotation (PRA) of the spindle, and 3) for supporting a cutting tool such as a boring bar at a controllable radial offset distance (ROD) from the PRA, wherein the ROD is adjusted by the head assembly as the head assembly is advanced along the PRA by the machining center, so that a bore or other desired type of workpiece formation is formed having one or more turned surfaces that differ in diameter as a function of their location along the PRA or vice versa. Features of the invention reside not only in the apparatus and but also in methods by which turned surfaces of varying diameter are formed, and in safety features that obtain through providing the apparatus with an electronically readable identification code that can be checked by control logic external to the head assembly to ensure that a correctly programmed head assembly carrying a correct cutting tool is being installed on a machining center to perform desired functions.

2. Prior Art

So-called "standard machining centers" are known that each utilize a spindle which is rotatable (relative to a workpiece on which cutting operations are to be performed) about a spindle rotation axis (referred to herein by the term "primary rotation axis" or by the abbreviation "PRA"), wherein the spindle is used to support a tool head or "head assembly" that rotates (together with the spindle on which it is mounted) about the PRA to bring a cutting tool that is carried by the head assembly into engagement with the workpiece to perform boring or other turning type cutting operations that center about the PRA.

Head assemblies utilized for such purposes typically are provided with tool holders that are manually adjusted to radially position (at a selected radial offset distance from the PRA, referred to herein by the abbreviation "ROD") such cutting tools as are mounted on their tool holders. Head assemblies having manually adjustable tool holders (i.e., the ROD of the tool holder is manually adjustable) often are used to bore holes of selected diameters in workpieces or to form turned surfaces with features having diameters that vary as functions of the position of these features along the associated PRA, or vice versa. Usually these manually adjustable head assemblies require that relative rotation of the head assembly and the workpiece be stopped when adjustments (i.e., ROD adjustments) are to be made as by manually repositioning the tool holders on the head assemblies.

Head assemblies also are known that incorporate an ability to effect ROD adjustments of their tool holders without stopping relative rotation of the tool holders and the workpieces. However, many of these so-called "easier to adjust" head assemblies have one or more associated drawbacks that have left a long-standing need for an improved boring and contouring apparatus that offers a radially adjustable tool holder that has the ability to coordinate the radial and axial positioning of cutting tools in a simple and effective manner to provide smoothly contoured workpiece surfaces of desired configuration.

One common drawback of present-day head assemblies that have tool holders with ROD adjustments that can be made during tool rotation is that they are not well suited for use with standard machining centers unless modifications are made to provide some means for transmitting control signals to the rotating head assembly to cause the cutting tool it carries to be properly ROD positioned. One approach that has been taken is to replace the normally solid spindles of standard machining centers with hollow spindles, through which mechanical movements (i.e., "mechanical control signals") can be provided to rotating head assemblies to cause their tool holders to effect proper ROD adjustments of cutting tools as cutting operations proceed. Another approach that has been taken is to provide standard machining centers with mechanical apparatus located to one side of their rotating head assemblies for transmitting control motions (i.e., "mechanical control signals") to the rotating head assemblies to carry out needed ROD adjustments mechanically. Still other approaches have called for the use of electrical contacts to transmit electrical control signals, or the use of transmitters and receivers of such non-mechanical, non-electrical control signals such as infrared light, to the rotating head assemblies so the head assemblies will coordinate the ROD positioning of cutting tools (that are being rotated by the head assemblies as the head assemblies are rotated by the machining centers) with the axial positions of these tools along the PRA—so that desired contours and profiles can be generated as cutting operations proceed.

If a standard machining center that has a capability to control the rotation and axial positioning along the PRA of a head assembly is to be provided with the added capability to control the ROD positioning of a cutting tool that is carried by the head assembly, this necessitates that some means be provided to coordinate ROD movements of a tool holder of the head assembly with the movements of other components of the machining center. Stated in another way, the addition of a radial tool positioning capacity to a machining center that does not have such a capacity has typically required that the machining center's numerical control system be modified or replaced, otherwise the required coordination of movements cannot be achieved. Making such modifications and replacements requires considerable technical skill and a good working knowledge of numerical controls, is expensive, and risks the introduction of inaccuracies and errors inasmuch as numeric control system components and their specifications must be matched to the particular servo motors and gear sizes and other features of the components that are used. In many instances, it may not be possible to retrofit a machining center with a new numerical control system that will provide radial cutting tool positioning control (i.e., that will control the ROD of a cutting tool which calls for the machining center to provide tool positioning control along what amounts to an "added axis") that is properly coordinated with other cutting tool movements (such as rotation about and axial movement along the PRA of the spindle).

Many of these proposed modifications and/or additions result in the provision of non-standard apparatus that is not interchangeable from one work station to another, and that is not well suited for use with automatic tool changing equipment that may be required in order to enable a machining center to perform sequential operations with efficiency. Some of the proposed additions and/or modifications provide non-standard structure that is so bulky, heavy and/or dynamically out of balance as to be unusable with smaller machining centers. In many instances, the additions and modifications that are required are found to compromise machining accuracy.

A deficiency of most previously proposed head assemblies has been their inability to automatically advance the radial position (i.e., the ROD) of a cutting tool during tool rotation, or to take other needed steps to accommodate or respond to factors that are encountered in a working environment, such as vibration, wear and backlash. Vibration may be encountered because the voltage (or other characteristics) of electrical control signals being fed to servo motors that control the positioning of components is too low or otherwise needs to be altered (for example, by making a needed voltage adjustment) to optimize servo motor performance under conditions that are encountered in carrying out a particular cutting operation. Backlash (in the form of "play" or looseness in drive system components that couple servo motors to tool holders to position the tool holders) may be present either due to the design of the drive system being used, or due to drive component wear that may occur with extended use. Compensation often needs to be made for such backlash if workpieces are to be machined with desired accuracy.

Still another deficiency has been the failure to incorporate safety features to prevent machining center operation when an incorrect head assembly or a head assembly carrying an incorrect cutting tool is installed thereon—a problem that easily can cause workpiece and/or apparatus damage as well as operator injury—a problem that necessitates that communication take place between a machining center and the head assemblies that are installed thereon, so that dangerous mismatches are prevented.

Other deficiencies encountered with previously proposed head assemblies that attempt to provide ROD adjustment of a cutting tool during rotation are associated with the physical size, complexity and cost of the proposed head assemblies. While it is known to provide head assemblies with counterweights that can be positioned to compensate at least to some degree for dynamic imbalance due to the radial offset positioning of a cutting tool and its tool holder, some proposed ROD-adjustable head assembly proposals eliminate the provision of counterweights because the head assemblies themselves are already too bulky in size, to complex in configuration, and/or too costly to permit the addition of counterweights. Compactness and simplicity of design have not been well achieved with many prior ROD adjustable head assembly proposals, high cost has prohibited wide implementation of prior head assembly proposals, and undue complexity of design has brought with it the attendant curse of operational unreliability and limited service life between "down times" when maintenance by trained technicians to replace deteriorated parts or to rebuild the head assemblies has proven necessary.

SUMMARY OF THE INVENTION

The present invention addresses the foregoing and other needs and drawbacks of the prior art by providing a well designed boring and contouring apparatus or "head assembly" that has an on-board micro-controller providing on-board logic that assists in carrying out such activities as 1) coordinating the radial positioning of the tool holder of the head assembly (with respect to a PRA of the head assembly) with other activities including the axial positioning (along the PRA) of the head assembly, 2) compensating for vibration, wear and backlash, and 3) communicating with an "off board" or remotely located controller (referred to from time to time herein as a "coordinating controller") to prevent damage and injury that can result if use is mistakenly attempted of an incorrectly programmed head assembly and/or a head assembly carrying an incorrect tool.

One aspect of the preferred practice of the present invention centers about the provision of a head assembly that incorporates a micro-controller, a servo motor and sensors to independently control the radial positioning (i.e., the "ROD") of a cutting tool mounted on the tool holder of the head assembly for rotation about the primary rotation axis (i.e., the "PRA") of the head assembly. This arrangement provides a means of augmenting the functionality of machining centers that lack the capability to alter the radial position (i.e., to adjust tool offset or "ROD" relative to the primary rotation axis or "PRA") of a rotating cutting tool, and/or the capability to coordinate the radial positioning of a tool holder with other real-time activities.

A significant aspect of the preferred practice of the present invention resides not only in the capability that is provided to independently control the radial positioning of a cutting tool carried by a tool holder of the head assembly, but perhaps more importantly the capability that is provided to link the radial positioning of the cutting tool to sensed positioning of the head assembly as the head assembly is translated along the primary rotation axis by the machining center that supports and rotates the head assembly. In accordance with preferred practice, control logic associated with the head assembly is provided with a program of instructions that defines for the head assembly a plurality of radial offset distances of the cutting tool that are to correspond to a set of axial positions of the cutting tool so that contours of a wide variety of configurations can be formed on a workpiece that is engaged by the cutting tool as the cutting tool is simultaneously moved axially along the primary axis of rotation by the machining center and moved radially by the head assembly. Smooth contours can be generated because radial offset positioning of the cutting tool is achieved in real time in response to sensed real time axial positionings of the cutting tool, with radial offset positioning being controlled as a function of sensed axial positioning as controlled by a program of instructions provided to control logic associated with the head assembly.

Still another aspect of preferred practice resides in providing a head assembly with a capability to automatically compensate for vibration, wear and backlash in radially positioning a rotating cutting tool. For example, the on-board micro-controller circuitry utilized in the preferred practice of the present invention includes an accelerometer chip that provides an output that varies with the character of sensed vibration—an output that may be is utilized by the on-board micro-controller, for example, to alter control signals that are being supplied to a servo motor that positions the cutting tool, which can be altered to minimize tool chatter that often is the cause of problematic vibration.

To compensate for backlash and wear in drive components that connect the servo motor to a tool slide of the head assembly that positions the tool holder, the system of the present invention preferably includes a pair of sensors located at opposite ends of the drive train. One of the sensors monitors the rotation of the drive shaft of the servo motor so that the on-board micro controller logic circuitry knows what the servo motor is doing in an effort to properly position the tool holder. The other of the sensors monitors the actual movements and positioning of the tool holder so that the on-board micro-controller also knows what actually is happening as efforts are made by the servo motor to position the tool holder. By comparing what the motor thinks it is doing with what actually is happening, the control signal being fed to the servo motor can be altered from "that which was expected to be needed to accomplish the intended result" to conform with "that which actually is needed under the circumstances encountered in the present real-time situation to achieve the needed result" —which is another way of saying that backlash (i.e., play or looseness) and wear in the drive system, together with other real-time factors, are taken into account and overcome by the system of the present invention.

Another aspect of preferred practice resides in the addition to a head assembly of safety features that aid in preventing inappropriate machine operation—such as may occur if an incorrectly programmed head assembly carrying an inappropriate tool is installed on the spindle of a machining center and operation is undertaken. In accordance with preferred practice, a head assembly that is programmed to perform a particular function on a particular machining center may be prevented from being installed on and operated by another machining center.

A significant feature that obtains with the head assembly design that embodies the preferred practice of the present invention is simplicity and compactness—i.e., a design that utilizes a novel and reliable arrangement of components that are combined in a cleverly nested manner that permits rugged drive components to nest and protectively shield more delicate electrical and electronic components, yielding a very compact, lightweight head assembly. Drive train components including a servo motor, a gear reducer and an encoder that monitors the servo motor are nested at the center of the head assembly, with the on-board micro-controller and other attendant circuitry carried on a circuit board that wraps compactly about the periphery of the gear reducer, and with the much heavier drive components that transmit torque from the spindle of the machining center to the cutting tool taking a tubular form that defines the outer diameter of the head assembly and that protectively surrounds the servo drive train components and the delicate circuitry of the head assembly.

A feature that also obtains with the preferred practice of the present invention is the inclusion of a set of counterweights that move automatically in directions opposite to the directions of movement of the tool slide that carries the tool holder and the head assembly. The compactness and simplicity of other components of the head assembly, and the compactness and simplicity of the counterweight system that is employed, make it possible for the head assembly to include counterweights that move automatically in directions opposite to movements of the tool slide to compensate for dynamic imbalance. The compactness of the counterweight system, and the lightness and compactness of the other components of the head assembly permits the inclusion of the counterweight system in the head assembly without adding unduly to the weight, size and complexity of the head assembly.

A desirable objective that is achieved with the preferred practice of the present invention is the provision of a head assembly that performs such functions as are outlined above while requiring the attachment of no new or unusual hardware to the spindle of a machining center. Head assemblies that embody the preferred practice of the present invention are shaped, sized and appropriately configured to enable them to be attached or removed from the spindle of a machining center by standard automatic tool changer equipment commonly used with machining centers.

Another desirable objective that is achieved with the preferred practice of the present invention is the provision of a head assembly that adds the aforementioned functions and features to the capability of a machining center without requiring modifications to or replacement of the control system that already is being used by the machining center. Augmenting the operation of the on-board micro-controller of the head assembly is an "off-board" or remotely located controller (a so-called "coordinating controller") that preferably is coupled to the existing control system of the machining center (the off-board controller can be coupled to existing control systems of a variety of types) to permit the control logic that is associated with the head assembly to intercept signals transmitted by the machining center's existing control system to one or more of the machining center's existing servo motors—so that intercepted information can be utilized by the control system of the present invention to correctly radially position a cutting tool relative to the axis of rotation (i.e., to effect ROD positioning relative to the PRA).

In preferred practice, the on-board and coordinating controllers (of the control logic that is associated with the head assembly) communicate with each other and with the control system of the machining center by means of asynchronous digital serial interfaces of the variety commonly used by the control systems typically found on present-day machining centers so as to allow commands and parameters to be sent to and among, and status received from and among these controllers to allow direct control and programming of the functions of the controllers to effect the desired operation of the head assembly, with real-time direct control of ROD positioning being provided together with monitoring of what is happening.

BRIEF DESCRIPTION OF THE DRAWINGS

These and other features, and a fuller understanding of the present invention may be had by referring to the following description and claims, taken in conjunction with the accompanying drawings, wherein:

FIG. 1 is a schematic perspective depiction of selected components of a conventional machining center such as a conventional boring machine, with a boring and contouring apparatus or "head assembly" that embodies the preferred practice of the present invention installed thereon, and with a cutting tool such as a boring bar supported by the tool holder of the head assembly;

DESCRIPTION OF THE PREFERRED EMBODIMENTS

Figure 2:
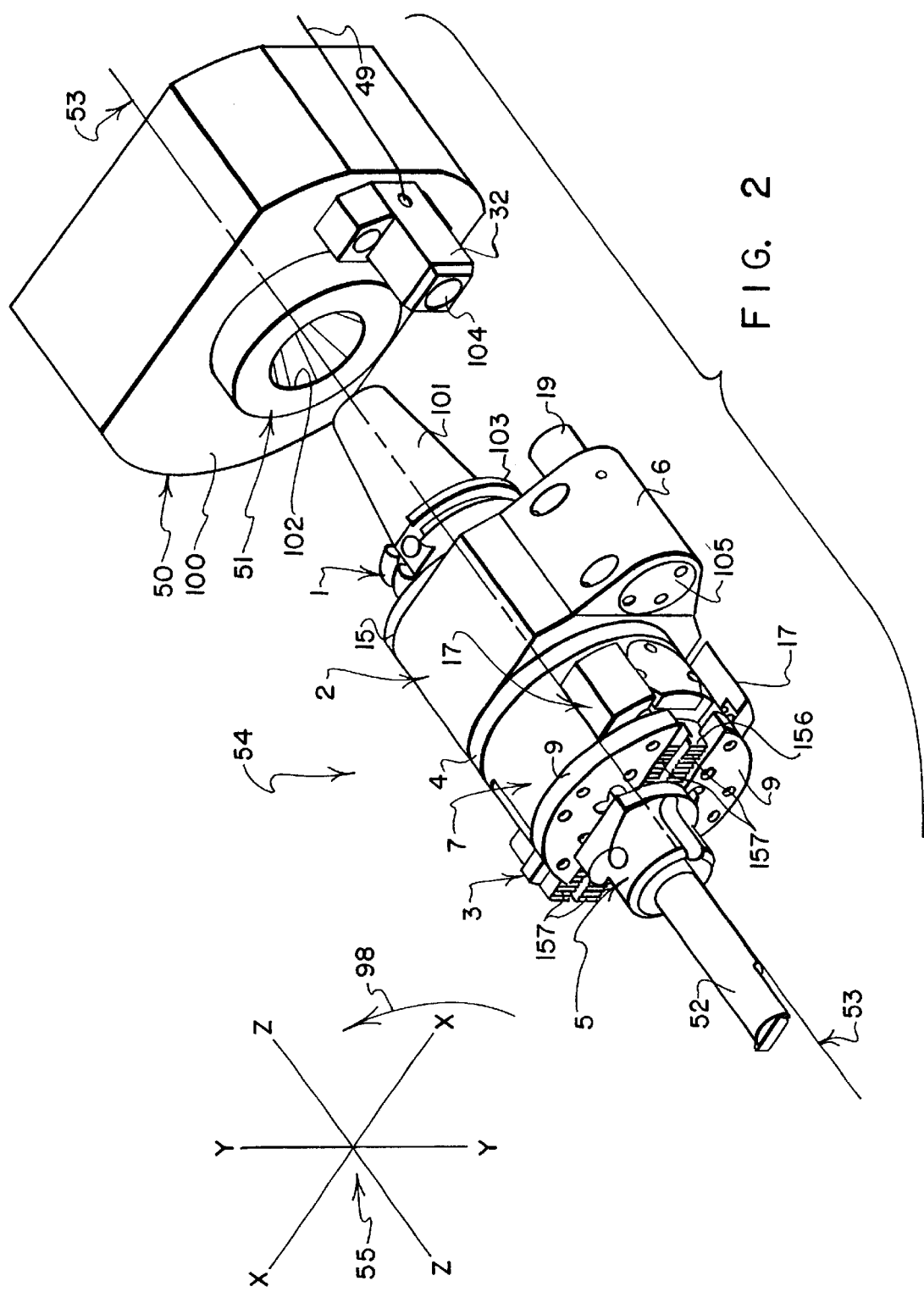
FIG. 2 is a perspective view of the head assembly removed from but aligned for attachment to a rotatable spindle of a head stock of the machining center of FIG. 1, with the view showing principally what will be referred to as top, right side, and front (i.e., tool-carrying) end portions of the head assembly.
Figure 11:
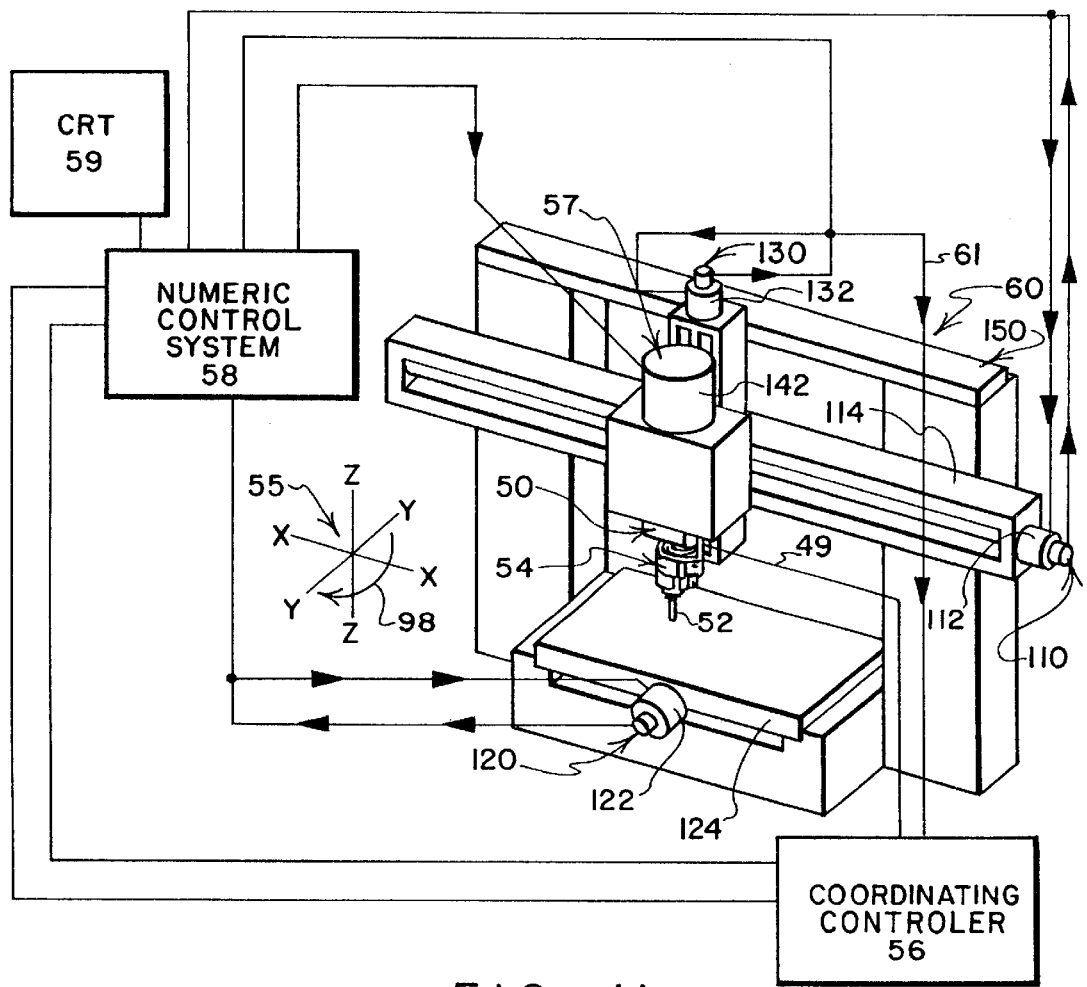
FIG. 11 is a is a schematic view depicting selected components of a machining center's numerical control system and how they are interconnected with various servo motors of the machining center and with the coordinating controller of the head assembly.

Referring to FIGS. 1, 2 and 11, a head stock of a conventional machining center 60 is indicated generally by the numeral 50. As is conventional and well understood by those who are skilled in the art, the machining center 60 has 1) non-rotating structure including a housing 100 of the head stock 50 which does not rotate but which cooperates with other non-rotating structure of the machining center 60 to rotatably support a spindle 51 which is rotatable about a primary rotation axis 53 (also referred to herein by the abbreviation "PRA"), 2) a drive system 57 which includes a drive motor 142 (shown only in FIGS. 1 and 11) for rotating the spindle 51 in a controlled manner about the primary rotation axis 53, and 3) other components that cooperate a) to support the head stock 50 and a workpiece W, and b) to effect relative movement of the head stock 50 and the workpiece W.

The controlled manner in which the head stock 50 and the workpiece W are moved relative to each other takes into account an orthogonal set of X, Y and Z axes that is designated in FIGS. 1, 2 and 11 by the numeral 55. In the set of axes 55, it will be seen that the Z-axis extends parallel to the primary rotation axis 53, and that the X and Y axes extend perpendicularly with respect to the Z-axis and with respect to each other. The purpose served by X-axis and Y-axis positionings of the spindle 51 by the machining center 60 is to bring the primary rotation axis 53 (the PRA) into exact alignment with a desired Z-axis so that movement of the head stock 50 along the Z-axis, at a time when a machining tool 52 such as a conventional boring bar is being rotated by the spindle 51, will cause the boring bar to form a workpiece bore B (see FIG. 1) that is centered about the desired Z-axis. Also shown adjacent the schematic depiction of the set of axes 55 is an arrow 98 which indicates a primary direction of rotation of the spindle 51 about the Z-axis (i.e., about the PRA when the PRA is aligned with the desired Z-axis of the bore B by operating the X-axis and Y-axis positioning systems 110, 120 to effect this alignment when the machining center 60 is being set up to form the workpiece bore B).

As those who are skilled in the art will readily understand, the machining center 60 may achieve the needed relative X-axis, Y-axis and Z-axis positioning of the head stock 50 and the workpiece W by moving either or both of the head stock 50 and the workpiece W along selected ones of the X-axis, the Y-axis and the Z-axis. In the machining center embodiment 60 depicted in FIG. 1, for example, X-axis, Y-axis and Z-axis positioning units 110, 120, 130 are connected to a supporting frame 150 so that X-axis positioning and Z-axis positioning is achieved by moving the head stock 50 relative to the frame 150, while Y-axis positioning is achieved by moving the workpiece W relative to the frame 150.

Referring to FIG. 1, the Z-axis positioning unit 130 includes a Z-axis servo motor 132 that is supported by the frame 150 for moving an X-axis carriage 114 vertically along the Z-axis. The X-axis positioning unit 110 includes an X-axis servo motor 112 supported by the carriage 114 for moving the head stock 50 horizontally along the X-axis. The Y-axis positioning unit 120 includes a servo motor 122 supported by the frame 150 for horizontally moving along the Y-axis a worktable 124 that supports the workpiece W, and to which the workpiece W is securely attached so that the workpiece W will not move relative to the worktable 124 during machining.

The conventional purpose of the X-axis, Y-axis and Z-axis positioning units 110, 120, 130 is to support and to effect relative movement of the head stock 50 and the workpiece W as may be needed to permit the rotating spindle 51 of the head stock 50 to perform boring operations on the workpiece W utilizing one or a variety of conventional cutting tools that are installed one at a time on the head stock 50 so as to be drivingly connected to the spindle 51 for rotation about the primary rotation axis 53. As is customary and conventional, the spindle 51 is provided with an internal taper 102 (see FIGS. 2 and 3) that diminishes steadily in diameter as it extends rearwardly along the primary rotation axis 53. The internal taper 102 faces forwardly along the primary rotation axis 53 for receiving and matingly engaging (so as to establish a driving connection therewith for rotating about the axis 53) correspondingly tapered, rearwardly extending end regions of a variety of types of cutting tools.

Figure 3:
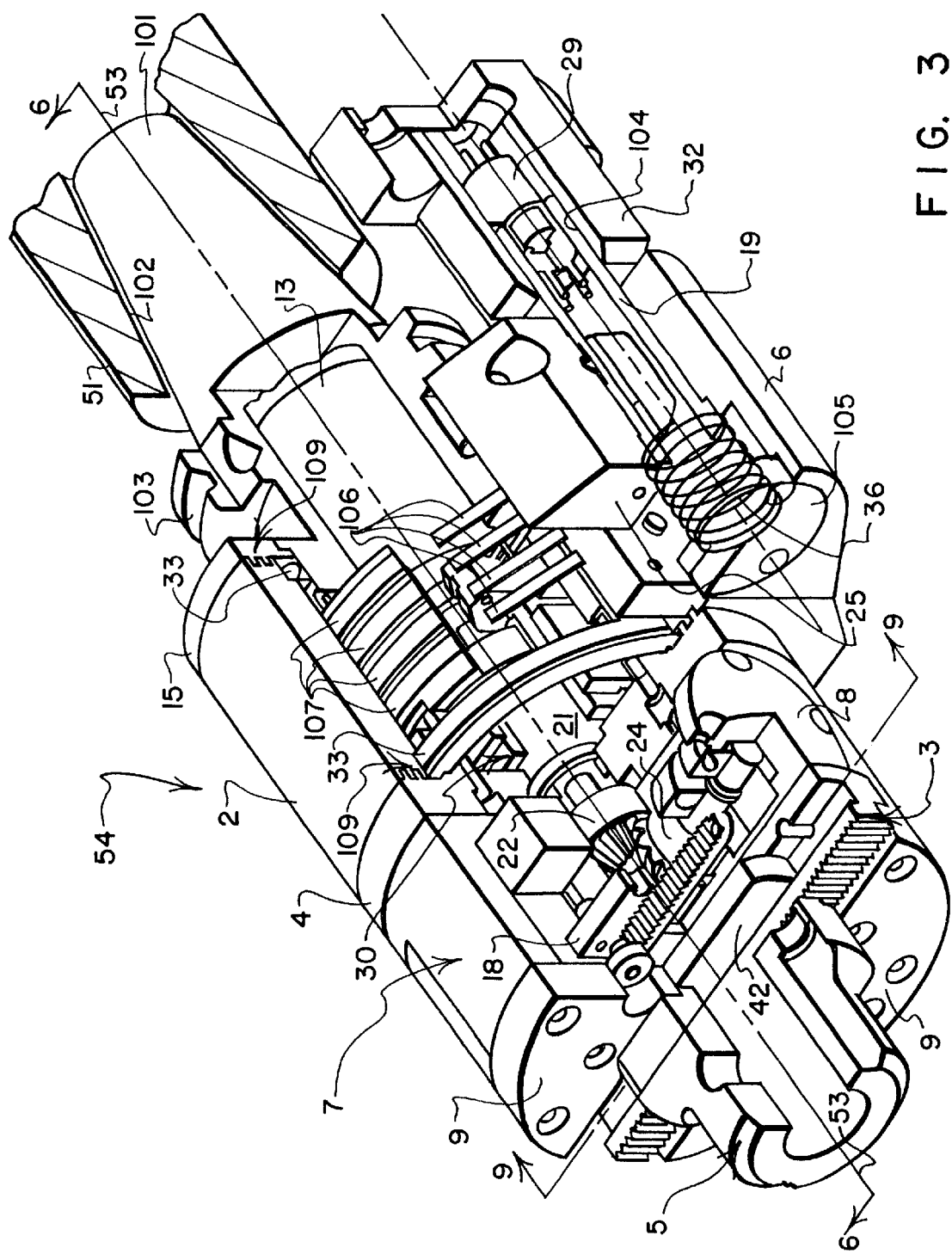
FIG. 3 is a perspective view similar to FIG. 2 but with the head assembly connected to the head stock, and with portions of the head assembly and the head stock broken away to permit underlying and normally hidden components and features to be viewed.

Referring to FIGS. 1–3, installed on the head stock 50, and designated generally by the numeral 54, is a boring and contouring apparatus or "head assembly" that embodies the best mode known to the inventor for carrying out the preferred practice of the present invention. One purpose of the apparatus or head assembly 54 is to provide a controllable device that mounts a conventional cutting tool 52 such as a boring bar on the spindle 51 and that rotates the cutting tool 52 about the primary rotation axis 53 (i.e., about the PRA 53 at a time when the head stock 50 is positioned and held in position by the X-axis and the Y-axis positioning units 110, 120 to maintain exact alignment of the PRA 53 with a desired Z-axis). Another purpose of the apparatus of head assembly 54 is to provide a controllable device that can be operated to move a cutting tool 52 such as a boring bar in a controlled manner radially relative to the primary rotation axis 53 to controllably adjust the radial offset distance (i.e., the "ROD") of the cutting tool 52 so that as a bore is machined in the workpiece W by the cutting tool 52, the resulting bore B (see FIG. 14) will feature an internal diameter that is smooth and that varies along its length to accurately conform to desired predetermined contour.

In operation, desired variations in diameter of the bore B at various locations along the length of the bore B are created by utilizing the head assembly 54 to effect controlled offset positioning of the cutting tool 52 while the head assembly is being rotated about and moved along the primary rotation axis 53 by the machining center 60. As the cutting tool 52 is caused to rotate about the primary rotation axis 53 (due to rotation of the head assembly 54 by the rotating spindle 51), and as the cutting tool 52 is moved along the Z-axis (due to movement of the head assembly 54 along the primary rotation axis 53 by the Z-axis positioning system 130 of the machining center 60), the cutting tool 52 is moved transversely with respect to the primary rotation axis 53 by radial movements of the tool holder 5. The position of the tool holder 5 (and hence the radial offset positioning of the cutting tool 52 relative to the primary rotation axis 53) is controlled by radial movements of a tool slide 3 (relative to a body 7 of the head assembly 54) on which the tool holder 5 is supported. Radial movements of the tool slide 3 are effected by a servo motor 13 that is protectively enclosed by the main drive member 1, and that is connected through a speed reducer 21, a set of bevel gears 22, 24, and a lead screw 14 to a lead screw nut 37 carried by the tool slide 3, with operation of the servo motor 13 being controlled by an on-board micro-controller 30 of the head assembly 54 which responds to control logic that is provided to it.

Figure 14:
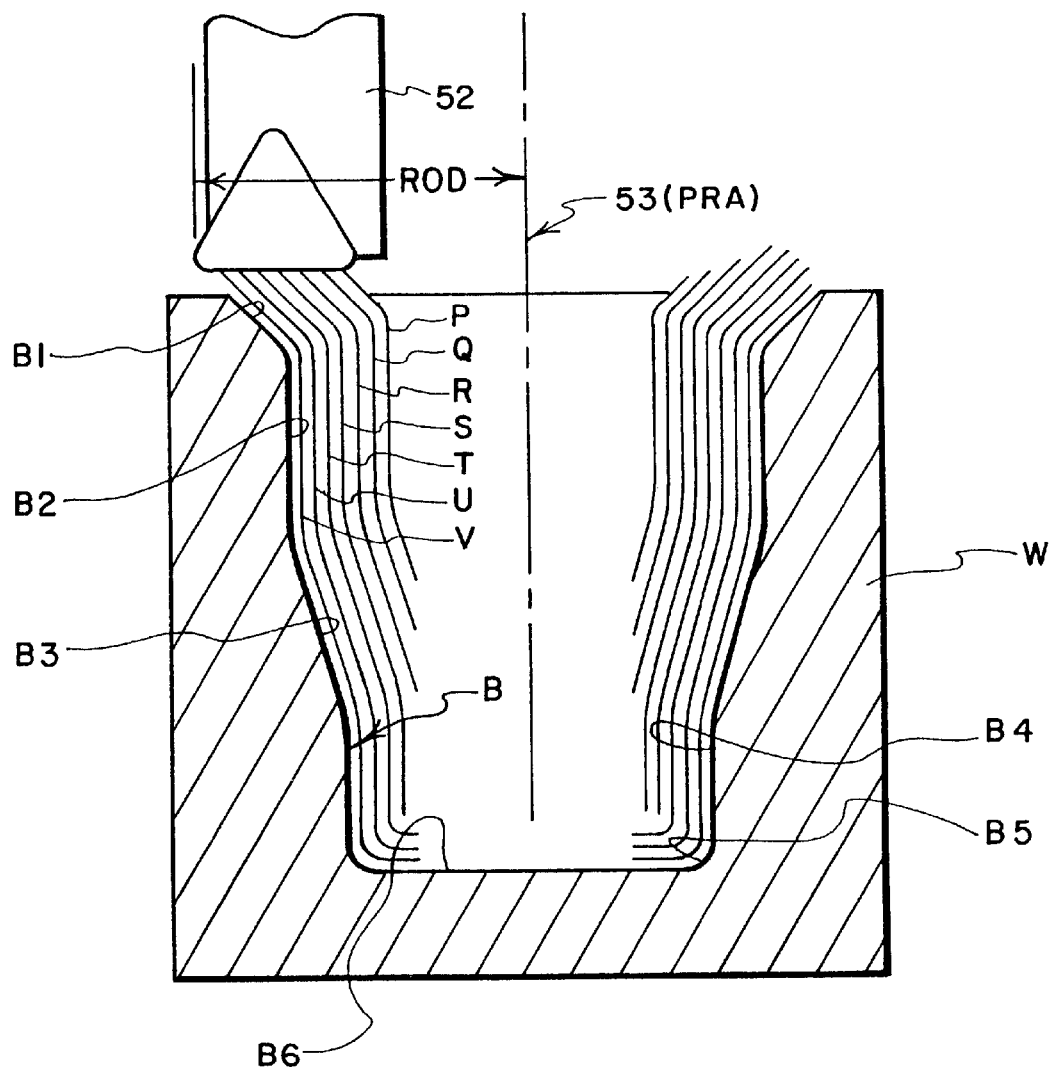

Referring to FIG. 14, it will be seen that a complexly configured bore B that has an outer chamfered region B1, a relatively large diameter region B2, a tapered region B3, a relatively smaller diameter region B4, and a radiused transition B5 to an end wall B6 can be formed by moving the cutting tool 52 through a series of passes P, Q, R, S, T, U and V to successively remove internal workpiece material to enlarge the bore within the workpiece W in a series of cutting passes so that, what remains in the end is the desired bore configuration B.

Effecting needed movements of the head assembly 54 and of the tool holder 5 to position the cutting tool 52 to carry out the sequential series of passes P, Q, R, S, T, U and V to provide the bore configuration B is accomplished 1) by providing a primary logic system of the machining center (for example, the numeric control device 58 depicted in FIG. 11) with what can be referred to as a primary program that controls the rotation of the spindle 51 about the primary axis of rotation 53 and that controls the translation of the spindle 51 along the primary axis of rotation 53 by the machining center 60, and 2) by providing a secondary logic system (for example, the on-board micro-controller 30 of the head assembly 54, depicted in FIGS. 3–6, in combination with the coordinating controller 56 depicted in FIG. 11) with what can be referred to as a secondary program that controls the radial positioning of the tool holder 5 relative to the primary axis of rotation 53.

Workpiece bores that are formed by utilizing the method and apparatus of the invention may differ in diameter along their lengths as may be needed, for example, to permit such elements as O-rings, snap rings, bearings, seals, caps and other typically annular or circular components to be installed within or to extend into selected regions of bores. Likewise, workpiece bores formed by utilizing the method and apparatus of the present invention may have diameters that vary along the length of the bores as may be needed to receive or otherwise accommodate different diameter portions such components as pistons and shafts that may be positioned in or that may move within selected regions of the bores. What the apparatus or head assembly 54 will be seen to provide is an admirably simple and straightforward device that functions in quite an intelligent and easily controlled manner to enhance the capability of conventional boring machines and other forms of so-called "machining centers" to form workpiece formations such as bores that are complexly configured, typically characterized by internal diameters that differ along the lengths of the bores.

Before turning to an overview of the components that comprise the head assembly 54, it is appropriate to observe that two types of connections are provided between the apparatus or head assembly 54 and the head stock 50 of the machining center. One of the connections is strictly mechanical in nature, but it performs the dual functions of 1) supporting the weight of the head assembly 54 and 2) of drivingly connecting the rotary spindle 51 of the machining center 60 to such components of the head assembly 54 as are intended to rotate about the primary rotation axis 53 together with the spindle 51. This mechanical connection is provided by inserting a conically tapered end region 101 of a main drive member 1 of the head assembly 54 into the tapered opening 102 of the spindle 51 with sufficient force to seat the tapered end region 101 in the tapered opening 102 to establish a connection between the spindle 51 and the main drive member 1 that will cause the weight of the head assembly 54 to be supported by the spindle 51, and that will cause the main drive member 1 to rotate with the spindle 51 about the primary rotation axis 53 (i.e., about the PRA) as though the main drive member 1 and the spindle 51 were formed as a single element. The tapered end configuration 101 and a pulleyshaped collar formation 103 that are defined by the main drive member 1 permit the head assembly 54 to be gripped by conventional tool changing equipment (not shown) and installed on the head stock 50 of the machining center 60, or removed therefrom and placed in a conventional tool magazine (not shown) for storage when not in use, in a manner well understood by those who are skilled in the art.

Referring to FIG. 2, the other of the connections is both mechanical and electrical in nature, and it serves the dual purposes of 1) mechanically connecting non-rotating elements of the head assembly 54 (including a non-rotating housing 2 of the head assembly 54, and a rearwardly extending positioning pin 19 carried by the housing to the non-rotating housing 102 of the head stock 50 (which carries a positioning block 32 that defines a forwardly facing opening 104 configured to receive and establish a mechanical connection with the positioning pin 19); and 2) of electrically connecting a plug 29 carried by the positioning pin 19 with a receptacle 34 carried at the rear of the opening 103 of the positioning block 32. This pin-to-block connection established between the positioning pin 19 and the positioning block 32 keeps the housing 2 of the head assembly 54 from rotating about the primary rotation axis 53, and provides an electrical connection that provides a pair of conductors for supplying electrical energy to the head assembly 54, and a pair of conductors for establishing a two-way serial digital data connection between the micro-controller 30 (located on-board the head assembly 54 within the confines of the non-rotatable housing 2, as depicted in FIGS. 3–6), and the coordinating controller 56 (see FIG. 11) located remotely (i.e., externally with respect to the head assembly 54 and at a location spaced therefrom).

To begin an overview of the components that comprise the head assembly 54, it is useful to observe that these components can reasonably be segregated into four groups for consideration:

1) A first group comprises components of the head assembly 54 that do not rotate about the primary rotation axis 53 with the spindle 51, namely components such as the non-rotating housing 2 of the head assembly 54 that are coupled (by the pin-to-block connection that is established between the positioning pin 19 and the positioning block 32) to the non-rotating housing 100 of the head stock 50.

2) A second group comprises components of the head assembly 54 that do rotate about the primary rotation axis 53 together with the spindle 51, including the main drive member 1 and the generally cylindrical body 7 that is rigidly coupled to the main drive member 1 (for movably supporting the tool slide 3 and the tool holder 5, which are components of the third group). Included among the components of the second group is a servo motor 13 which is protectively nested at a central location within the confines of a tubular portion of the main drive member 1, and which cooperates with drive elements (of the third group) to radially position the tool slide 3.

Figure 7:
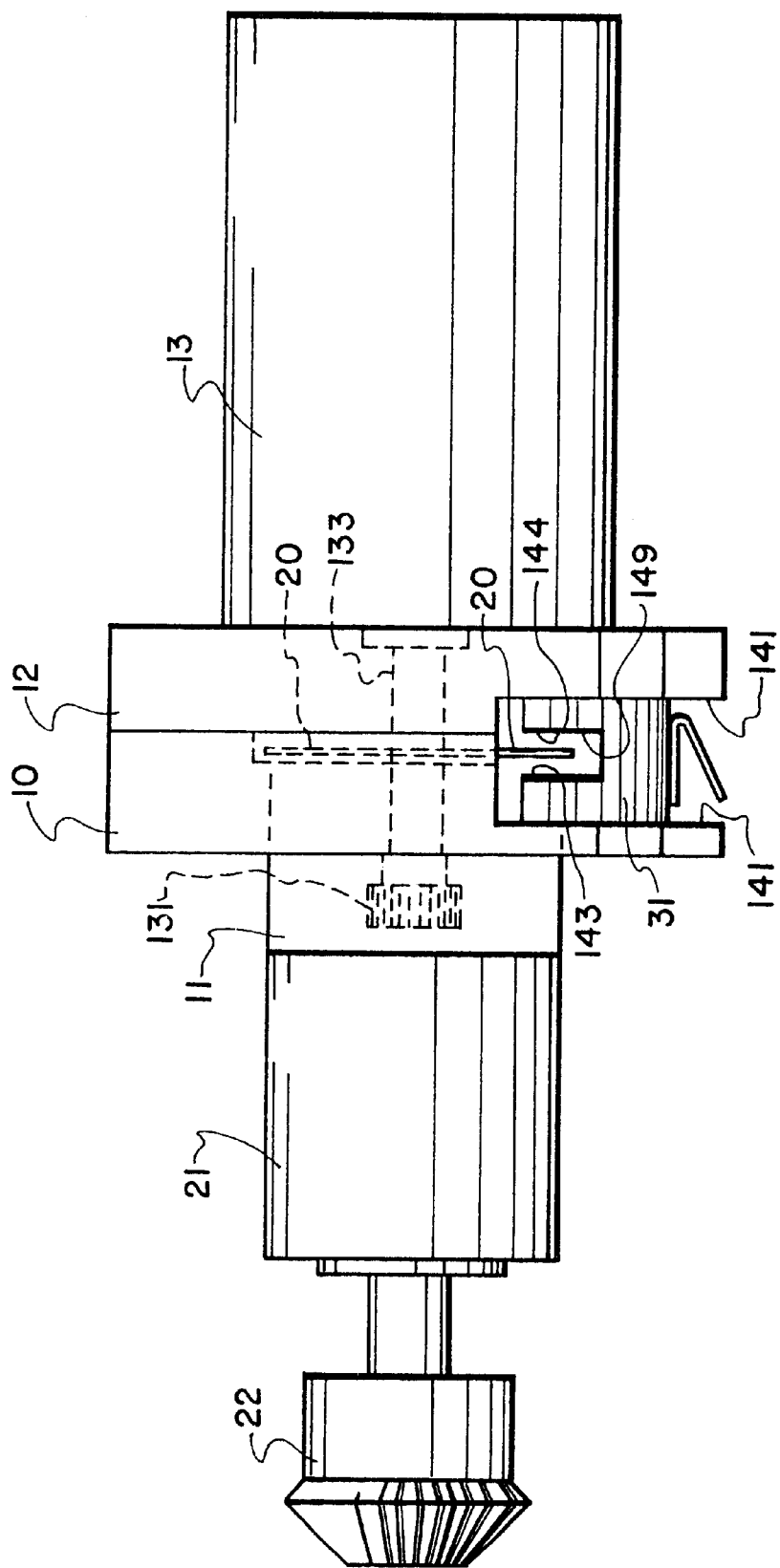
FIG. 7 is a top plan view, on an enlarged scale, showing selected, centrally located elements of a drive train of a tool positioning system that effects radial offset positioning of a tool slide of that carries the tool holder of the head assembly.
Figure 8:
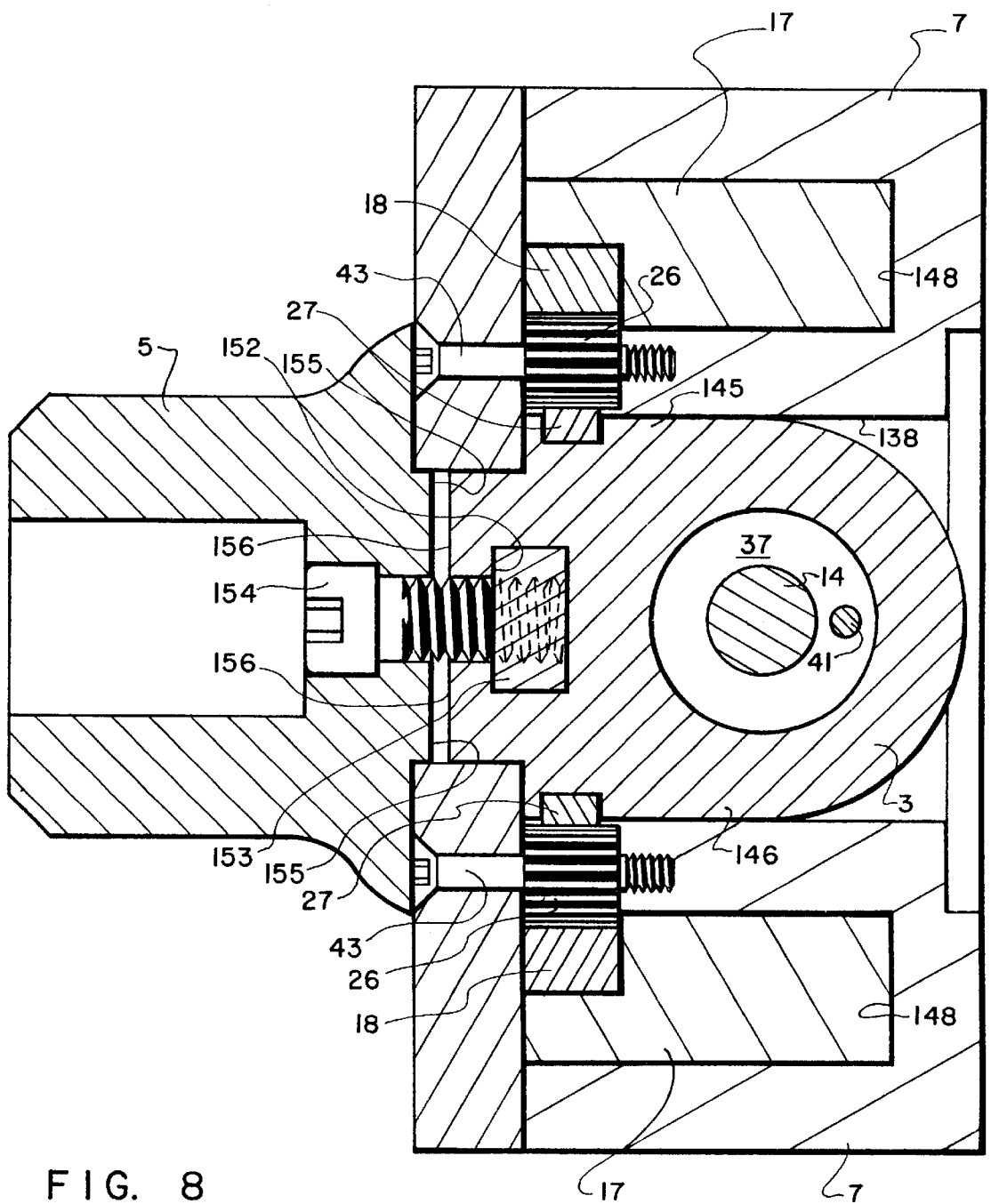
FIG. 8 is a sectional view, on an enlarged scale, showing other tool positioning components of the head assembly that are located near the front (i.e., tool-carrying) end of the head assembly, with sectioned components principally broken away to the center plane indicated by the line 6—6 in FIG. 3.

3) A third group includes components that not only rotate about the primary rotation axis 53 together with the components of the second group, but also serve in a further capacity either to radially move the tool slide 3 or that react to radial movement of the tool slide 3, for example to counterbalance the effect that repositioning of the tool slide 3 may have on the dynamic balance of the rotating head assembly 54. Many of the components of the third group are supported by the rotatable body 7 (an element of the second group), such as the tool slide 3 and a pair of counterweights 17. Several of the components of the third group cooperate to provide what will be referred to as a "tool positioning unit" 140, many of the elements of which are depicted in FIGS. 7 and 8.

A fourth group includes components that are protectively housed by components of the first and second groups, and that function to sense relative positions of component of the head assembly 54, to sense conditions of operation of the head assembly 54, and/or to control the the operation of selected components of the head assembly 54. Group four components include a rotary encoder 31 that monitors the rotation of a drive shaft 133 of the servo motor 13, a linear encoder 48 that monitors the position of the tool slide 3, the micro-controller 30, and an accelerometer chip 160 that is carried on a circuit board 162 of the micro-controller 30.

Figure 4:
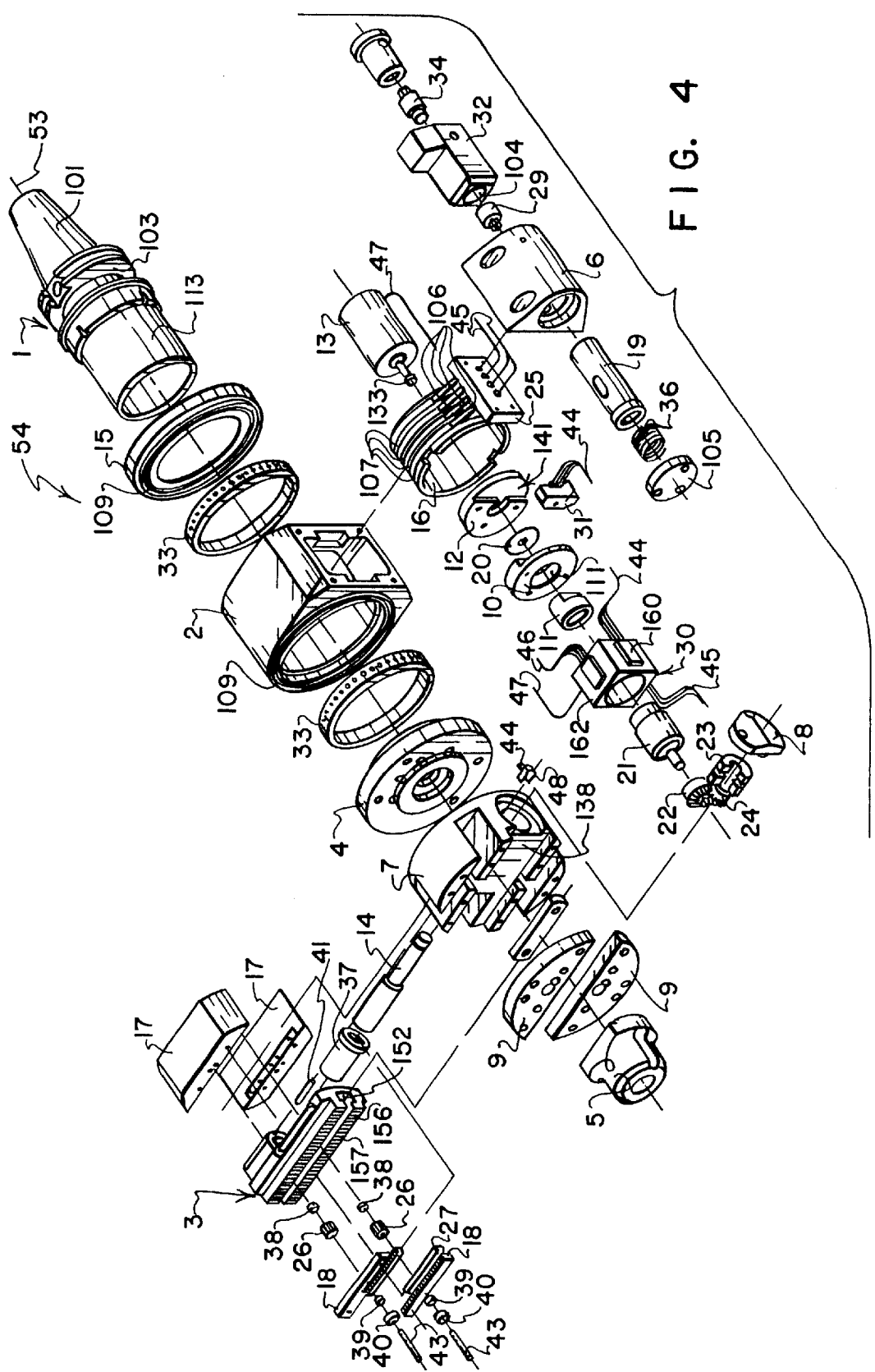
FIG. 4 is an exploded perspective view showing selected components of the head assembly and positioning block and electrical connector components of the head stock.
Figure 5:
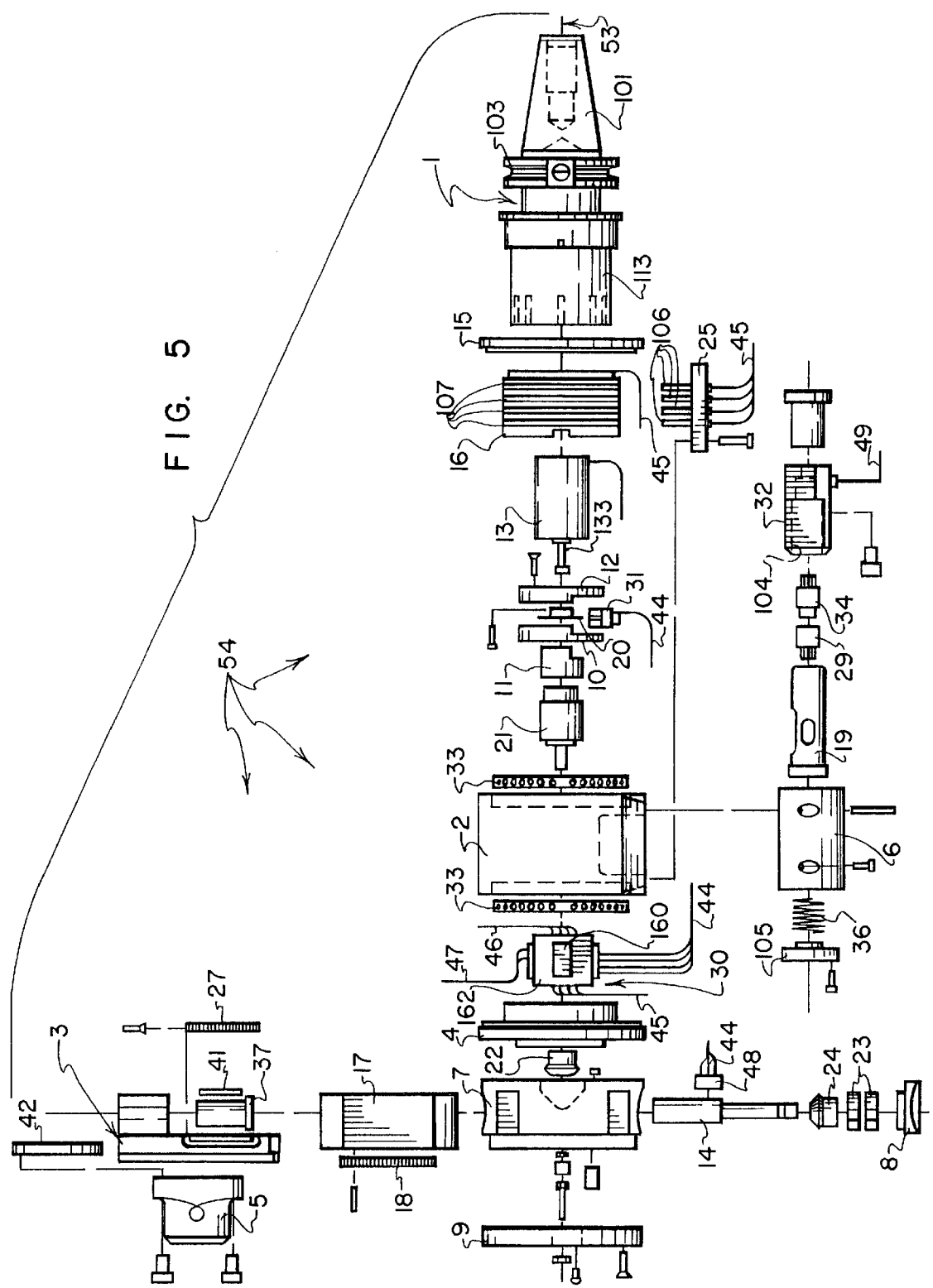
FIG. 5 is an exploded top plan view that also shows many of the components of the head assembly.
Figure 6:
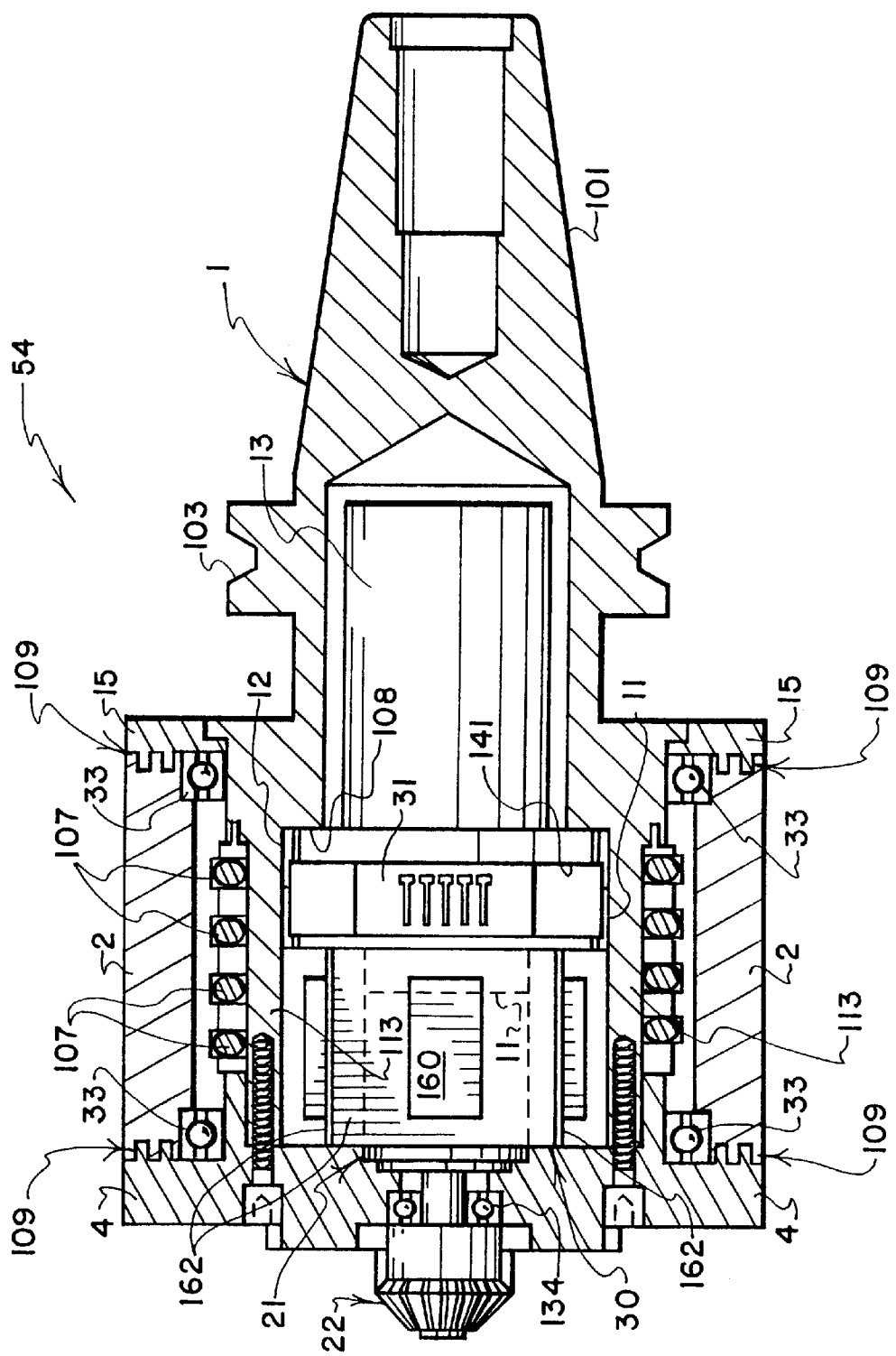
FIG. 6 is a right side elevational view, on an enlarged scale, showing selected components of the head assembly that are located near the rear (i.e., non-tool-carrying) end of the head assembly, with some components broken away to a center plane indicated by a line 6—6 in FIG. 3.

Referring to FIGS. 4 and 6, chief among components of the first group—components that do not rotate about the primary rotation axis 53—is the hollow, generally cylindrical housing 2 of the head assembly 54 which has a side extension housing 6. The side extension housing 6 supports the positioning pin 19 and other elements of a positioning pin assembly that include a spring 36 which engages an end cap 105 of the extension housing 6 to bias the plug 29 toward the receptacle 34 to assure that proper electrical connections are established between the plug 29 and the receptacle 34 when the positioning pin 19 is inserted into the opening 104 of the positioning block 32. Another non-rotating component is a brush block 25 that carries four brushes 106 and is housed within the extension housing 6. Two pairs of wires 45 (see FIGS. 4 and 5) electrically connect the brushes 310 with four pins of the male plug 29. The four pins of the male plug 29 connect, in turn, with a corresponding set of four pin sockets of the receptacle 34 that electrically connects with a plural-conductor wire (see FIGS. 2 and 11) that connects with the coordinating controller 56 (FIG. 11).

Prominent among components of the head assembly 54 that do rotate with the spindle 51—namely components of the second group—are the main drive member 1 and a pair of rotatable annular end plates 4, 15 that close opposite ends of the non-rotating housing 2, and a rather massive rotatable cylindrical body 7 (which supports many of the components of a tool positioning unit 140—i.e., components of the third group that include the tool slide 3 and the counterweights 17). Referring to FIGS. 3 and 6, close tolerance labyrinths 109 are defined by interfitting rim-like formations of the end plates 4, 15 and the housing 2 that permit the end plates 4, 15 to rotate relative to the housing 2 while preventing passage therebetween of foreign matter. The rotating elements of group two also include a slip-ring type commutator assembly 16 that extends about a central tubular portion 113 of the main drive member 1, and that includes four rotating rings 107 that are engaged by the non-rotating brushes 106 such that each of the brushes 106 establishes electrical connection with a separate one of the rings 107.

Also included in the rotating elements of group two are a pair of circular plates 10, 12 that are bolted to an internal shoulder 108 (see FIG. 6) of the main drive member 1; a servo motor 13 (see FIGS. 6 and 7) that is bolted to the circular plate 12; and a gear type speed reducer 21 (see FIGS. 3, 6 and 7) that is bolted to the end plate 15 and carries an adapter 11 (see FIG. 7) that extends from the speed reducer 21 into a central opening 111 (see FIG. 4) defined by the circular plate Included among the group three components are elements of the tool positioning unit 140, some of which are connected to the body 7, but others of which are located along the primary rotation axis 53 and spaced from the body 7. Referring to FIG. 7, components of the tool positioning unit 140 that are not carried by the body 7 include a drive shaft 133 of the servo motor 13, an adapter 11 through which the drive shaft 133 extends in order to provide input to the gear type speed reducer 21, and an output shaft of the speed reducer 21 that extends through a bearing 134 (see FIG. 6) and carries the miter gear 22 (shown in FIGS. 3–7).

Referring to FIG. 8, components of the tool positioning unit 140 that are carried by the body include a lead screw 14 that is journaled by bearings 23 that are carried in a passage 135 of the body 7 that is closed by an end cap 8, and a miter gear 24 that is pinned to the lead screw 14 and has its teeth drivingly engaged by the miter gear 22, and an interiorly threaded nut 37 that is connected to a rear tubular portion of the tool slide 3 for moving the slide transversely (i.e., radially with respect to the PRT 53 within a transversely extending passage 138 defined by the body 7) when the lead screw 14 is rotated so as to thread into and out of the nut 37.

The speed reducer 21 preferably has a reduction ratio of 20 to 1 so that the operation of the servo motor 13 will rotate the lead screw 14 relatively slowly even though the servo motor 13 may be operated at rotation speeds (the servo motor 13 preferably is selected to be a highly responsive motor that is capable of operating at far higher speeds of rotation, such as 6500 rpm, than are normally required in this application) that are appropriate to quickly and correctly move the tool slide 3 transversely to position the cutting tool 52.

Notable among the fourth group of components are the rotary and linear encoders 31, 48, the micro-controller 30, and the accelerometer chip 160. Referring to FIGS. 4, 6 and 7, the rotary encoder 31 is mounted in a recess 141 cooperatively defined in side portions of the cylindrical plates 10, 12. Referring to FIG. 7, the rotary encoder 31 is a commercially purchased device that is available from a variety of sources. The housing of the rotary encoder 31 defines a notch 149 across which a light beam is projected, for example, from a light source 143 located on one side of the notch 149 to a light receiver 144 located on the other side of the notch 149, such as a light sensitive transistor—an arrangement that, in a conventional way well known to those who are skilled in the art, permits an electrical signal to be generated when the light beam from the source 143 to the receiver 144 is interrupted as it travels across the width of the notch 149. A rotary encoder of this type is available, for example, from Hewlett Packard, Model No. HEDS-5500.

Referring still to FIG. 7, extending into the notch 149 of the rotary encoder 31 and serving to interrupt the light beam of the rotary encoder 31 (in a manner that generates pulses of light that are received by the receiver 144 so as to cause a pulsed electrical signal to be generated by the encoder 31) is a thin disc-like encoder wheel 20 that is mounted on an output shaft 133 of the servo motor 13 for rotation therewith. The output shaft 133 extends through aligned hollow interiors of the cylindrical plates 10, 12, and mounts a drive gear 131. To permit the wheel 20 to rotate, the plates 10, 12 cooperate to define a hollow interior region that loosely surrounds the disc-like wheel 20 except where the disclike wheel 20 projects into the recess 141 and into the notch 149 of the rotary encoder 31. Peripheral portions of the encoder wheel 20 are provided with radially extending holes (not shown) or radially extending slots (not shown) that, in a manner well understood by those who are skilled in the art, will interrupt the light beam of the rotary encoder 31 to cause an electrical signal generated by the rotary encoder 31 to be pulsed at a frequency that is directly proportional to the speed of rotation of the speed of the drive shaft 133 of the servo motor 13.

Referring to FIGS. 4 and 5, the linear encoder component 48 and the pin-like component 41 comprise a commercially purchased unit that is available from a variety of sources, known in the art as a linear variable differential transformer (or "LVDT"). Referring to FIG. 8, the pin 41 is connected to the lead screw nut 37 and to a rear portion of the tool slide 3 (for radial movement with the tool slide within a transversely extending passage 138 defined by the body 7) and projects transversely through an open area of the passage 138 alongside the lead screw 14. The linear encoder component 48 (see FIGS. 4 and 5) is carried by the body 7 at a suitable location within the passage 138 so as to extend alongside the pin 41. Primary windings (not shown) provided in the pin-like component 41 cooperate with secondary windings (not shown) that are provided in the encoder component 48 to convert relative translatory relative movement of the components 41, 48 into a pulsed electrical signal that is monitored by the micro-controller 30 to keep track of the actual radial position of the tool slide 3 relative to the body 7. One such linear encoder is sold by Trans-Tek, Incorporated, Model No. 0354-0000, although other linear encoders sold by Trans-Tek and by other manufacturers can be substituted.

In operation, the rotary encoder 31 tells the micro-controller 30 what the servo motor is doing in an effort to position the tool slide 3 in a desired manner that corresponds with a program that has been supplied to the micro-controller 30. At the same time, the linear encoder 48 reports to the micro-controller 30 the exact actual radial position of the tool slide 3. By comparing the information supplied by the two encoders 31, 48, the micro-controller is able to determine whether the control signal it is supplying to the servo motor 13 that is causing the servo motor 13 to operate in a way that is expected to achieve a desired positioning of the tool slide 3 actually is achieving this desired positioning—and, if the desired positioning is not being achieved by supplying a control signal to the servo motor 13 that is expected to achieve the desired result, the micro-controller can modify the control signal being supplied to the servo motor 13 to more accurately achieve the desired result—all of which happens terribly rapidly in accordance with the speed of operation of modern-day CPU processing circuitry.

Referring to FIGS. 4–6, the micro-controller 30 can employ any of a wide variety of CPU and memory chips mountec on a circuit board 162. In preferred practice, the circuit board 162 is a three-fold, four-sided structure that wraps about but is electrically insulated from the speed reducer 21. Also carried on the circuit board 162 of the micro-controller 30 is an accelerometer chip 160. The accelerometer chip 160 is sensitive to acceleration of the type that is encountered when a mechanical device such as the head assembly 54 is subject to vibration of the type that can occur in the event the cutting tool 52 "chatters" —a phenomena sometimes encountered when a cutting tool is not being held in place with sufficient force to maintain its position quite rigidly. Because tool chatter and undue vibration of the head assembly 54 are undesirable, the presence of such vibration is desirable to detect and to eliminate, or at least minimize.

The presence of the accelerometer chip 160 permits the needed detection of such vibration. The output signal provided by the accelerometer chip 160 is fed to the on-board micro-controller 30 which seeks to eliminate or minimize sensed vibration by modifying the control signal being supplied to the servo motor 13, possibly by increasing the voltage of this signal to help the servo motor 13 to more forcefully position the cutting tool 52, which hopefully will have the desired effect of at least diminishing the magnitude of the vibration that is sensed by the accelerometer 160. Inasmuch as all of this happens terribly quickly in accordance with the speed of modernday CPU circuitry, it is possible for the on-board micro-controller 30 to test a set of ways in which the control signal to the servo motor 13 can be altered and to determine what alteration provides the best diminishment of vibration intensity so the most successful alteration can be employed under the circumstances at hand to steady the cutting tool 52 and to diminish sensed vibration.

Figure 9:
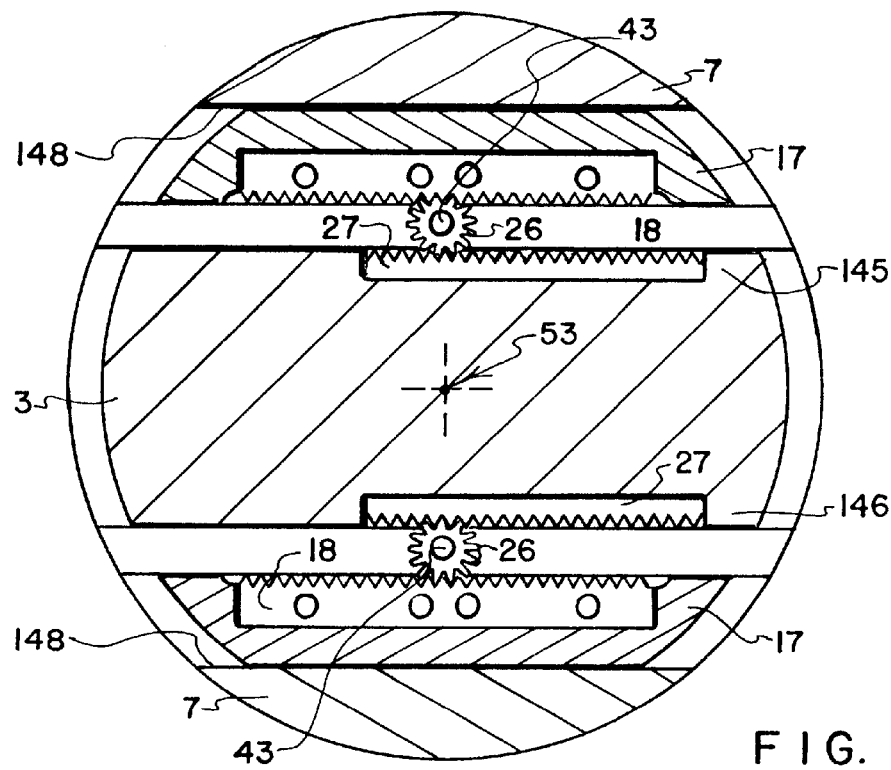
FIG. 9 is a sectional view, on an enlarged scale, as seen from a plane indicated by a line 9—9 in FIG. 3.
Figure 10:
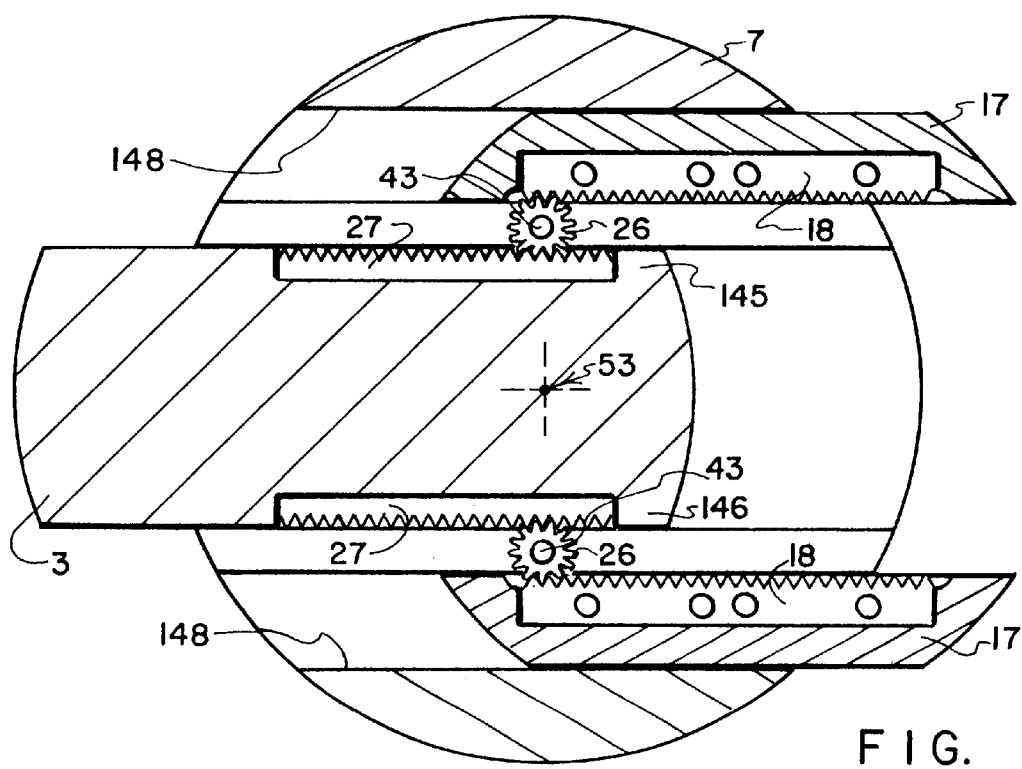
FIG. 10 is a sectional view similar to FIG. 9 but showing a tool slide moved leftwardly and a pair of counterweights moved rightward in comparison with the positions of these components occupy in FIG. 9.

Referring to FIGS. 8–10, the tool slide 3 has upper and lower portions 145, 146 that carry gear racks 27 that face toward and are drivingly engaged by gears 26. Fasteners 43 that are connected to substantially semicircular face plates 9 and to the body 7 (see FIG. 8) rotatably mount the gears 26. Referring to FIGS. 4, spacers 39 and bearings 38, 40 (which do not appear in FIG. 8) also are provided on the fasteners 43 to assist in rotatably mounting and positioning the gears 26 on the fasteners 147.

Referring again to FIGS. 8–10, the counterweights 17 are slidably positioned in chambers 148 that are defined by the body 7 and that are closed along their front sides by the face plates 9. The chambers 148 and the counterweights 17 extend parallel to the length of the tool slide 3 and to a central channel 138 (see FIGS. 4 and 8) defined by the body 7 that slidably mounts the tool slide 3 for radial movement relative to the body 7. Gear racks 18 are carried by the counterweights 17 and drivingly engage the gears 26. By this arrangement, when the tool slide moves leftwardly (as shown in FIG. 10) relative to the body 7, the counterweights 17 are caused to move rightwardly, and vice versa. The gears 26 and the gear racks 18, 27 provide close-tolerance driving connections between the tool slide 3 and the counterweights 17 that permits little if any play therebetween.

Referring to FIG. 8, a T-slot 152 is defined by the tool slide 3 that slidably carries a bar 153. One or more suitable fasteners (such as the threaded fastener 154) connect the tool holder 5 to the bar 153. When the fastener 154 is tightened, the bar 153 is clamped against front surfaces of the T-slot 152, and rear surfaces 155 of the tool holder 5 are clamped against front surface portions 156 of the tool slide 3.

As is best seen in FIGS. 2 and 4, the front surface portions 156 of the tool slide 3 are provided with finely serrated formations 157 much like the teeth of a gear rack. The rear surfaces 155 of the tool holder 5 are provided with identical serrated, tooth-like formations (not shown) that mate with the serrated formations 157 machined in the front surface portions 156 so that, when the fastener 154 is tightened, the serrated formations of the tool holder 5 and the tool slide 3 engage so as to immovably connect the tool holder 5 to the tool slide 3.

As those who are skilled in the art will readily understand, the tool holder 5 can be positioned at any of a variety of selected locations along the front of the tool slide 3 (at substantially any location where the serrated formations of the tool holder 5 and the tool slide 3 can properly engage to immovably couple the tool holder 5 to the tool slide 3. The location selected for securing the tool holder 5 to the tool slide 3 should take reasonably into account such factors as the amount of dynamic imbalance that may be caused by the cutting tool 52 and the tool holder 5 being positioned to one side of the primary axis of rotation 53, the diameter of the bore B that is to be formed in the workpiece W, and the extent to which the movement of the counterweights 17 may best be utilized to at least partially offset the dynamic imbalance that results when the tool holder 3 extends to increase the radial offset distance of the cutting tool 52.

As is quite apparent, there seldom will arise a circumstance in which the counterweights 17 are able to fully offset or compensate for the dynamic imbalance that are provided by the cutting tool 52, the tool holder 5, and the tool slide 3 which moves the cutting tool 52 and the tool holder 5 radially relative to the primary axis of rotation 53 during normal operation of the head assembly 54. Therefore, common sense and a basic understanding of what is involved in trying to minimize the dynamic imbalance of rotating components can be used to reasonably position the tool holder 5 on the tool slide 3 to take these and other considerations involved in providing a good tool set-up into account in an effort to minimize dynamic imbalance in a particular set of circumstances.

Turning now to FIG. 11, the machining center 60 includes a conventional numeric control system 58 that controls the X-axis, Y-axis and Z-axis positioning units 110, 120 and 130, respectively. The positioning units 110, 120, 130 are operated in a conventional manner by the conventional numeric control system 58 (or by whatever other type of control system that may be utilized by a particular machining center) to effect relative movements of the head stock 50 and the worktable 124 that carries the workpiece W. The relative movements that typically are carried out are those that are needed to permit the rotating spindle 51 of the head stock 50 to perform boring operations on the workpiece w utilizing one or a variety of conventional cutting tools (such as the boring bar 52) that are installed one at a time on the head stock spindle 51. The numeric control system 58 typically is programmed by an operator with a set of codes that specify, in a step by step fashion, each movement that needs to be carried out by the positioning units 110, 120, 130 as well as the times when the spindle 51 should be rotated by the drive motor 142, and the speeds with which these functions should be performed. If other parameters are needed in order to properly carry out simple boring operations and the like, this information also is provided to the numeric control system 58 so that the machining center 60 can properly carry out its work.

However, as has been discussed earlier herein, a typical numeric control system 58 of a typical machining center 60 does not have the ability to effect ROD positioning of a cutting tool that is mounted directly on the head stock 50—i.e., the numeric control system 58 is not configured to coordinate radial movements of a cutting tool relative to a fixed rotation axis (the PRA) about which the spindle 51 rotates—therefore, it is necessary for the machining center 60 and its numeric control system 58 to be augmented in order provide a capability to do what is referred to in the art as "contouring" as well as simple boring of uniform diameter holes. With an ability to do "contouring," the internal diameters of bores being formed in workpieces can be "contoured" so as to vary in accordance with a desired predetermined pattern or contour.

In accordance with the preferred practice of the present invention, the machining center 60 and its numeric control system 58 are augmented by providing the "coordinating controller" 58 (which is interchangeably referred to in the referenced provisional application as a "host controller" 58 or as a "coordinating controller" 58), and by providing the head assembly 54 which carries the on-board microcontroller 30. Since the coordinating controller 58 is not located "on board" the head assembly 58, it is, in essence, and "off-board controller" or a controller that is "external" to the head assembly 54. If the numeric control system 58 is thought of as providing "primary logic" that receives and operates in accordance with what can be called a "primary program," the serial-port-interconnected on-board microcontroller 30 and the coordinating controller 58, taken together, can be thought of as comprising "secondary logic" that receives and operates in accordance with what can be called a "secondary program."

Figure 12:
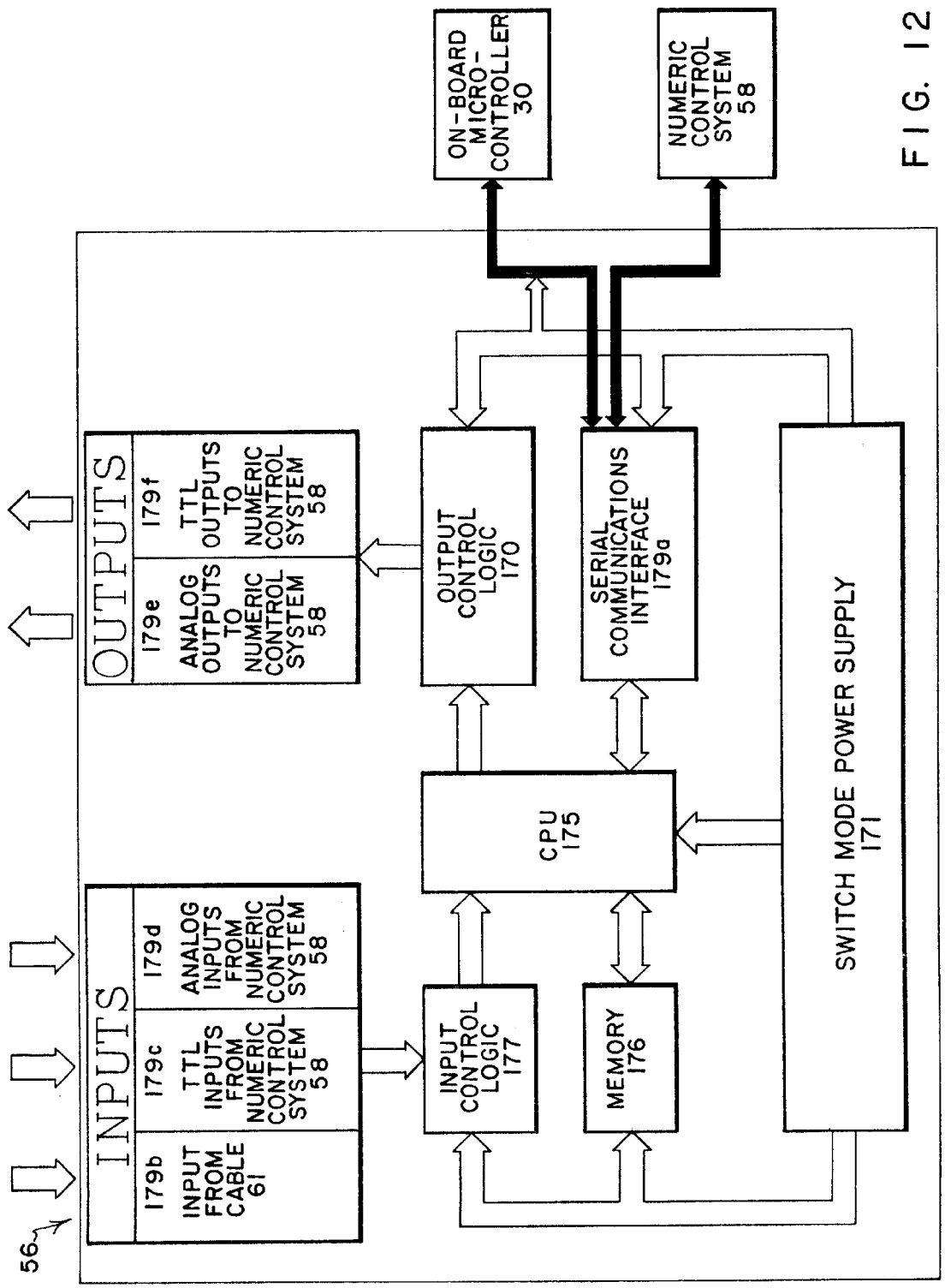
FIG. 12 is a block diagram of the coordinating controller and its components and interfaces.

FIG. 12 depicts components of the coordinating controller 56, which is seen to comprise a CPU 175 coupled to memory 176, a serial communications interface 179a, input control logic 177, and output control logic 170, all of which are supplied with power by a switch mode power supply 171. The input control logic 177 is further coupled to inputs 179b through 179d; the output control logic 170 is further coupled to outputs 179e and 179f; and the serial communications interface 179a provides a pair of digital serial communications ports. Taken together, the inputs 179b through 179d, the outputs 179e and 179f, and the serial communications interface 179a provide various interfaces by which the coordinating controller 56 may be interfaced with the numeric control system 58 of the machining center 60, with the on-board micro-controller 30 of the head assembly 54, or with other devices.

Referring to FIGS. 11 and 12, part of the way in which the numeric control system 58 is augmented is by coupling the coordinating controller 56 to the numeric control system 58 by way of one or more of the interfaces 179a through 179f. The serial communications interface 179a provides a pair of serial digital communications ports, at least one of which is compatible with those commonly found on numeric control systems of the type typically included in present-day machining centers. In preferred practice, one of the serial digital communications ports of the serial communications interface 179a of the coordinating controller 56 is interfaced to a serial port on the numeric control system 58 such that, when the numeric control system 58 is programmed by an operator in preparation for performing a machining operation such as boring or contouring, at least part of the program can be relayed by the numeric control system 58 to the coordinating controller 56.

The input 179b provides an interface that is used to monitor the signals that are sent by the numeric control system 58 to the Z-axis positioning unit 130, and a simple Y-cable 61 is employed to permit this monitoring to take place. The inputs 179c and 179d, and the outputs 179e and 179f are meant to provide a mechanism by which the numeric control system 58 and the coordinating controller 56 (in conjunction with the on-board micro-controller 30) can coordinate the movements of the head stock 50 of the machining center 60 with the movements of the tool holder 5 of the head assembly 54. The input 179c provides an input for receipt of TTL signals from the numeric control system 58, while the input 179b provides the option of an analog input. Similarly, the output 179e provides a TTL output to the numeric control system 58, while the output 179f provides the option of an analog output.

Figure 13:
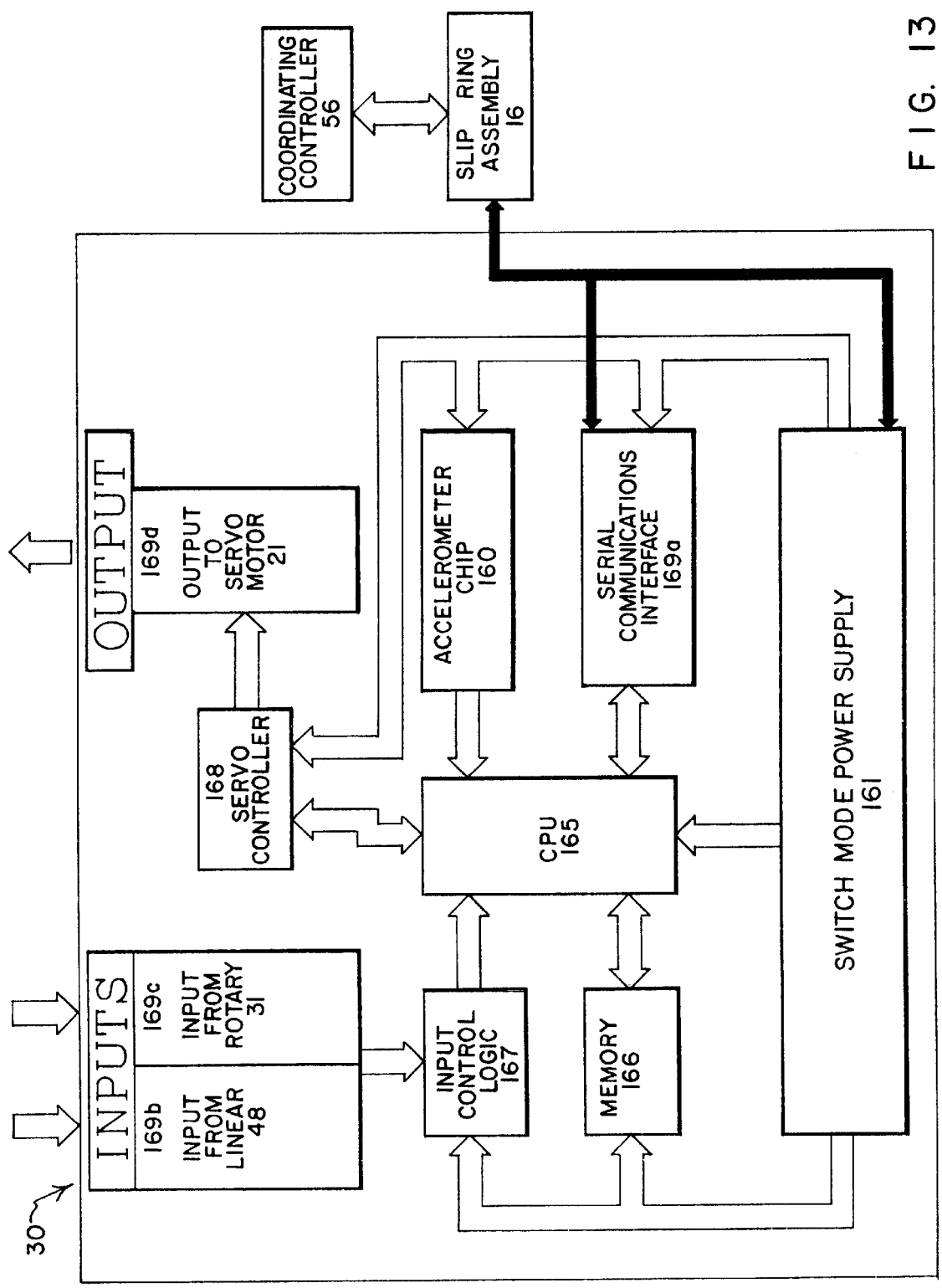
FIG. 13 is a block diagram of the on-board microcontroller of the head assembly and its components and interfaces; and, FIG. 14 is a side elevational view showing a boring bar adjacent a workpiece which is shown in cross-section to permit a bore formed therein to be viewed, with broken lines depicting successive cuts made by the boring bar to form the bore.

FIG. 13 depicts components of the on-board micro-controller 30 carried by the head assembly 54. The on-board micro-controller 30 is comprised of a CPU 165 coupled to memory 166, a serial communications interface 169a, input control logic 167, a servo controller 168, and the accelerometer chip 160, all of which are supplied with power by a switch mode power supply 161. The input logic 167 is further coupled to the inputs 169b and 169c; the servo controller 168 is further coupled to the output 169d; and the serial communications interface 169a provides a serial digital communications port. The inputs 169b and 169c provide interfaces to receive signals from the linear encoder 48 and from the rotary encoder 31 (shown in FIGS. 4 and 5). The output 169d provides an interface to the control servo motor 13 (shown in FIGS. 3–6). Taken together, the inputs 169b and 169c, the output 169d, and the serial communications interface 169a provide various interfaces by which the on-board microcontroller 30 may be interfaced with various devices both within and external to the head assembly 54.

Referring to FIGS. 12 and 13, another part of the way by which the numeric control system 58 is augmented is by coupling the coordinating controller 56 to the on-board micro-controller 30. In preferred practice, one of the serial digital communications ports of the serial communications interface 179a of the coordinating controller 56 is interfaced to the serial digital communications port of the serial communications interface 169a of the on-board micro-controller 30 such that the coordinating controller 56 can send commands to the on-board microcontroller 30, and receives status information therefrom. The outputs of the linear encoder 48 and the rotary encoder 31, received by way of the inputs 169b and 169c, respectively, provide, a mechanism by which the on-board micro-controller 30 can both monitor and compensate for inaccuracies in the ROD positioning of the tool holder 5. Inaccuracies can arise, as previously mentioned, due to the effects of centrifugal force on the rotating head assembly 54, or due to other causes such as backlash or wear of mechanical components that are employed to effect ROD positioning (as by moving the tool slide 3 that carries the tool holder 5). The servo motor 13 is coupled to the micro-controller 30 by way of the output 169d, which allows the micro-controller 30 (in conjunction with the coordinating controller 56) to control ROD positioning in coordinating with the positioning of the head stock 50 that is effected by the numeric control system 58.

What all of this provides, in effect, is a combination of an on-board micro-controller 30 and a coordinating controller 56 that always knows the position along the primary rotation axis 53 (the PAR) of the cutting tip of the cutting tool 52, and that responds in real time mode to this PAR positioning of the tool 52 by the numeric control system 58 (which is a "primary control logic system" that can be thought of as responding to a "primary control program" fed to it) by carrying out radial offset distance (ROD) positioning of the cutting tool 52 in accordance with what can be referred to as a "secondary control program" that is fed to the "secondary control logic" that is provided by the communicating combination of the on-board micro-controller 30 and the off-board coordinating controller 56.

A "primary control program" for a typical numeric control system 58 is comprised of a series of commands specifying movement along the X, Y and Z axes 55, the rates at which such movement is to be effected, the times at which the spindle 51 is to be rotated, and the rotation speeds of the spindle 51. Typically, there also are commands that can be included in the "primary control program" that perform various other functions such as driving one or more TTL outputs of the numeric control system 58 to standard high or low TTL levels, or placing a specified voltage on a variable analog output. Typically, there are still more available commands that can be used to cause the execution of a series of commands to be stopped pending receipt of a high or low signal on a TTL input of the numeric control system 58, or pending receipt of a specified voltage on an analog input. Still further commands may be provided that allow for the transmission of specified data on a serial digital communications port, or to make further execution of a program contingent on the receipt of specified data from a serial digital communications port. Often such commands and such input and output functions of a typical numeric control system 58 are used to coordinate actions taken by a numeric control system 58 during a machining operation with other apparatus, e.g., measuring devices, or a tool changer. Often a numeric control system 58 also is programmed or configured by design to respond to such inputs to effect the immediate halting of all operations in the event of an emergency signaled on one of the inputs.

In accordance with the preferred practice of the present invention, an operator programs the numeric control system 58 of the machining center 60 that carries the head assembly 54 on its spindle 51 by loading a program into the numeric control system 58—preferably a program that includes commands for both the numeric control system 58 and the coordinating controller 56, it being understood that the combination of the coordinating controller 56 and the on-board micro-controller 30 is interfaced by way of one of the serial digital communications ports provided by the serial communications interface 179a to a serial port of the numeric control system 58 so that, as the numeric control system 58 is programmed, at least part of that program is relayed to the coordinating controller 56. Alternatively, the combination of the coordinating controller 56 and the on-board micro-controller 30 can be programmed separately with a program matching the program supplied to the numeric control system 58. While the programs provided by an operator to the numeric control system 58 and to the combination of the coordinating controller 56 and the on-board micro-controller 30 could be identical, they may also differ and simply contain code portions that match.

During operation of the machining center 60, the numeric control system 58 moves the head stock 50 into position relative to the workpiece W on the coordinate system 55 in preparation for performing a boring or contouring operation. The numeric control system 58 then signals the coordinating controller 56, which cooperates with the on-board micro-controller 30 to position the tool holder 5 at the appropriate starting ROD position, and signals the numeric control system 58. In this way, the numeric control system 58 and the coordinating controller 56 "lock step" or engage in "handshaking" to coordinate with each other as each proceeds through the various movements programmed by the operator. In preferred practice, at least one TTL or analog output of the numeric control system 58 is connected to a corresponding TTL or analog input of the coordinating controller 56, and vice versa, to provide for this handshaking. Alternatively, the needed handshaking can be implemented by way of codes sent between the numeric control system and the coordinating controller 56 by way of a serial digital communications link between a serial digital communications controller 179a and a serial digital communications port of the numeric control system 58.

In preferred practice, after correct positioning of the head stock 50 and of the tool holder 5 has been achieved, and after appropriate handshaking has taken place, the prescribed boring or contouring operation begins. If the operation to be performed includes movement by the head stock 50 along the primary rotation axis 53 by the Z-axis positioning unit 130, then the coordinating controller 56 would have been programmed with starting and ending positions for each Z-axis or PRA move that is to be made, along with corresponding starting and ending ROD positions. As a move from a starting to an ending position takes place along the Z-axis, the coordinating controller 58, in conjunction with the on-board micro-controller 30, monitors the progress of this move and effects appropriate corresponding radial movement of the tool holder 5, changing its ROD in real time in response, and slowing down, speeding up, or stopping and resuming the movement of the tool holder 5 in coordination with any slowing down, speeding up, or stopping or resuming of movement along the Z-axis. This monitoring of progress of movement along the Z-axis is effected by connecting the input 179b of the coordinating controller 56 to receive the signals that are transmitted by the numeric control system 58 to the Z-axis positioning unit 130 by way of the Y-cable 61. Alternatively, if the given operation to be performed does not include movement along the Z-axis, then the coordinating controller 56 would have been programmed with starting and ending ROD positions, along with the feed rate at which ROD positioning is to be changed as the operation is carried out.

Referring to FIG. 13, the coordinating controller 56 and the on-board micro-controller are connected for serial digital communication between a serial digital communications port provided by the serial communications interfaces 179a of the coordinating controller 56 and 169a of the on-board micro-controller 30. Through this connection, the on-board micro-controller 30 cooperates with the coordinating controller 56 to position the tool holder 5 as needed to carry out a given machining operation. The on-board micro-controller 30 includes the servo-motor controller 168 which signals the servo motor 13 by way of the output 169d. The on-board micro-controller 30 also includes inputs 169b and 169c which receive the outputs from the linear encoder 48 and the rotary encoder 31, respectively, for monitoring the ROD positioning of the tool slide 3 and the speed of rotation of the servo motor drive shaft 133, respectively. The use of two encoders at different points in the drive train by which the servo motor 13 effects changes in ROD positioning of the cutting tool 52 allows the micro-controller 30 to compensate for any backlash (i.e., "play" or "looseness") arising from the design of the drive train and/or from mechanical wear on components of the drive train to ensure accurate ROD positioning of the tool holder 5.

The on-board micro-controller 30 also includes the accelerometer chip 160 for monitoring the centrifugal forces experienced by the head assembly 54 while rotating and while carrying out a particular cutting operation. If the micro-controller 30 is programmed to try to minimize the vibration that is experienced by the head assembly 54 during a cutting operation, it can utilize the accelerometer chip 160 to detect vibration (increased vibration is sensed as an increase in the acceleration or "g-force" that is experienced by the accelerometer chip 160 and that is reported to the CPU 165 of the on-board micro-controller 30 by altering the output signal the chip 160 sends to the CPU 165) and to alter the signals that are sent to the servo motor 13 in an effort to counteract the detrimental effect that tool vibration or "chatter" may have on the accuracy of the machining operation being carried out by the cutting tool 52.

A further feature of preferred practice resides in providing the on-board micro-controller 30 with an identification code that can be read by the coordinating controller 56, and that can be used to distinguish a particular head assembly 54 from among a plurality of head assemblies. Different head assemblies carrying different cutting tools, or provided with different programs, can be distinguished one from another by assigning them identification codes that differ. If the identification code carried by a particular head assembly is read and checked when installed on the machining center (and perhaps also from time to time while installed on the machining center), the detection of an inappropriate identification code can be used to prevent or immediately stop the operation of the machining center to ensure that errors in machining are not made, that damage is not done to machinery and/or to workpieces, and that injuries do not occur because incorrect head assemblies and/or incorrect cutting tools and/or incorrect programming has been provided that has associated with it an inappropriate identification code. Additionally, the on-board micro-controller can be provided with the ability to make use of updated information concerning the dimensions of a cutting tool that is mounted on the head assembly, whereby tool wear can be compensated for quite easily to ensure that contours that are machined with the worn cutting tool accurately conform to desired dimensions.

As will be apparent from the foregoing description the present invention provides a number of features that are believed to be novel and entitled to protection. A boring and contouring apparatus or "head assembly" is provided that has a radially movable tool holder, the position of which is controlled by an on-board micro-controller and servo motor that, in effect, perform radial interpolation movement (i.e., radial movement of the tool holder and of a cutting tool connected thereto relative to the axis of rotation of a spindle on which the apparatus is mounted) in order to cause the cutting tool to engage a workpiece and to form on the workpiece a surface of desired contour or a bore of desired configuration as the cutting tool is positioned by radial movements of the tool holder (relative to the axis of rotation of the spindle) and by axial movements of the apparatus (in directions extending along the axis of rotation of the spindle). Also, a coordinating controller and micro-controller combination is provided that splits the logic system of the head assembly in a novel way to position its components sensibly for use; and, novel safety features are provided to prevent the wrong head assembly assembly and/or a head assembly carrying an incorrect tool from being used by a machining center.

While the invention has been described with a certain degree of particularity, it will be understood that the present disclosure of the preferred embodiment has been made only by way of example, and that numerous changes in the details of construction and the combination and arrangement of elements can be resorted to without departing from the true spirit and scope of the invention.

What is claimed is:

1. In a machining center, the combination of:
   a rotatable and translatable machine tool spindle, a boring and contouring head assembly for attachment to the spindle to support the head assembly, said spindle rotating a rotatable part of the head assembly that carries a cutting tool holder,
   a first drive device for rotating the spindle, the rotatable part of the head assembly, and the tool holder about a primary axis of rotation, and,
   a feed device for translating the spindle, the head assembly and the tool holder along the primary axis of rotation,
   a second drive device for operating the head assembly to radially position the tool holder relative to the primary axis of rotation for controlling a radial offset distance from the primary axis of rotation of a cutting tool carried by the tool holder while the first drive device is rotating the spindle, the rotatable part of the head assembly, the tool holder and the cutting tool about the primary axis of rotation and while the feed device is translating the spindle, the head assembly, and the tool holder along the primary axis of rotation to cause the cutting tool to cut a formation of predetermined configuration in a workpiece that is engaged by the cutting tool, wherein the configuration of the formation cut by the cutting tool is characterized by a plurality of diameters that differ in accordance with radial positions of the cutting tool with respect to the primary axis of rotation,
   wherein the machining center has a primary control logic that controls both (1) the rotation of the spindle, the rotatable part of the head assembly, the tool holder and the cutting tool about the primary axis of rotation by the feed device, and (2) the translation of the spindle, the head assembly, the tool holder and the cutting tool along the primary axis of rotation by the feed device, and,
   wherein secondary control logic connected to the primary control logic controls the radial positioning relative to the primary axis of rotation of the tool holder and the cutting tool in response to the positioning of the cutting tool along the primary axis of rotation, and,
   wherein further at least a part of the secondary control logic is carried by the rotatable part of the head assembly.

2. The combination of claim 1 wherein another part of the secondary control logic is located at a distance spaced from the head assembly, wherein the head assembly includes means for establishing communication between the rotatable part of the head assembly and a part of the head assembly that does not rotate about the primary axis of rotation, and the part of the secondary control logic carried by the rotatable part of the head assembly communicates with the another part of the secondary control logic by utilizing said means for establishing communication.

3. The combination of claim 1 wherein the second drive device includes a servo motor carried by the rotatable part of the head assembly, and drive components that couple an output shaft of the servo motor to the tool holder for radially positioning the tool holder relative to the primary axis of rotation.

4. The combination of claim 3 wherein the second drive device also includes a speed reducer connected to the output shaft of the servo motor, a set of miter gears that couple an output shaft of the speed reducer to a lead screw connected to the tool holder for radially positioning the tool holder in response to rotation of the lead screw by the set of miter gears, the speed reducer and the output shaft of the servo motor.

5. The combination of claim 4 additionally including a tool slide that is moved by the lead screw radially in response to rotation of the lead screw, wherein the tool holder is removably attached to the tool slide for movement therewith, and wherein the head assembly is provided with at least one counterweight for opposite-direction movement relative to the tool holder in response to movement of the tool holder.

6. The combination of claim 5 additionally including gearing that drivingly interconnects the tool slide with the at least one counterweight to directly drivingly couple the tool slide and the at least one counterweight for said opposite-direction movement.

7. The combination of claim 4 wherein the rotatable part of the head assembly includes a main drive member that drivingly connects with the spindle for rotation about the primary axis of rotation concurrently with the spindle, and a rotatable body connected to the main drive member for rotation therewith about the primary axis of rotation, wherein the lead screw is rotatably supported by the rotatable body, wherein the tool holder is supported by the rotatable body for radial movement relative to the primary axis of rotation in response to rotation of the lead screw, and wherein at least a selected one of the main drive member and a part of the head assembly that does not rotate about the primary axis of rotation defines a protective enclosure that extends about the servo motor and the speed reducer.

8. The combination of claim 7 wherein the part of the secondary control logic that is carried by the head assembly is housed within the protective enclosure.

9. The combination of claim 8 wherein the part of the secondary control logic that is carried by the head assembly includes a printed circuit board positioned near the speed reducer.

10. The combination of claim 9 wherein the printed circuit board has a first portion that extends in a first plane alongside a first peripheral portion of the speed reducer, and a second portion that extends in a second plane along a second peripheral portion of the speed reducer.

11. The combination of claim 7 wherein the part of the secondary control logic that is carried by the head assembly includes a first encoder for monitoring the speed of rotation of the output shaft of the servo motor, a second encoder for monitoring the position of the tool holder relative to the body, and control logic for operating the servo motor to effect accurate positioning of the tool holder as monitored by the second encoder even if play is present among the set of miter gears and the lead screw that connect the output shaft of the servo motor to the tool holder for positioning the tool holder relative to the primary axis of rotation.

12. The combination of claim 1 wherein the head assembly carries an electronically readable identification code to allow it to be distinguished from other head assemblies among a plurality of head assemblies.

13. The combination of claim 12 wherein at least a part of the secondary control logic is external to the head assembly, and the at least a part of the secondary logic that is external to the head assembly is operable to read the electronically readable identification code carried by the head assembly and to generate an out-put configured to be used to prevent the rotation of the head assembly by the machining center if the electronically readable identification code, when read, is found to be an inappropriate electronically readable identification code.

14. The combination of claim 12 wherein the electronically readable identification code and the output generated by the secondary control logic are used as a way to identify a particular head assembly on which a particular cutting tool has been installed from a plurality of head assemblies on which other cutting tools have been installed, and to prevent rotation of the particular head assembly if the particular cutting tool installed thereon is an inappropriate cutting tool.

15. The combination of claim 1 wherein the part of the secondary control circuitry that is carried by the head assembly includes an accelerometer for sensing centrifugal force experienced by the head assembly during rotation of the rotatable part of the head assembly.

16. The combination of claim 15 wherein the accelerometer generates an output signal representative of the magnitude of sensed centrifugal force that results from vibration of the head assembly during rotation of the rotatable part of the head assembly, and the secondary control logic responds to the output to modify the operation of the servo motor in an effort to diminish the vibration.

17. The combination of claim 1 wherein the secondary control logic responds to a program provided to the secondary control logic to calculate at least one desired radial position relative to the primary axis of rotation for the tool holder, and to operate the second drive means to position the tool holder at the desired radial position.

18. The combination of claim 1 wherein the secondary control logic monitors signals used by the primary control logic to control the positioning and movement of the head assembly along the primary axis of rotation, and to operate the second drive means to coordinate the radial positioning of the tool holder relative to the primary axis of rotation in accordance with a program provided to the secondary control logic.

19. The combination of claim 1 additionally including elements for moving in directions opposite to the directions of movement of the tool holder to at least partially counteract such dynamic imbalance as may be caused to the head assembly by the radial positioning relative to the primary axis of rotation of the too holder.

20. An apparatus for use in boring and contouring with a machining center having a primary control logic for positioning and moving a spindle of the machining center along a primary axis of rotation while rotating the spindle about the primary axis of rotation, comprising:
 a) head assembly for attachment to the spindle of the machining center for rotation together with the spindle about the primary axis of rotation, wherein the head assembly carries a tool holder that is movable radially with respect to the primary axis of rotation; and,
 b) a secondary control logic carried at least in part by the head assembly and configured to attach to the primary control logic to control movement of the head assembly to control the movement of the tool holder radially with respect to the primary axis of rotation in response to the positioning and moving of the head assembly along the primary axis of rotation by the primary control logic, and in response to a program used by the secondary control logic to calculate at least one desired radial position relative to the primary axis of rotation for the tool holder.

21. The apparatus of claim 20 wherein the secondary control logic monitors signals used by the primary control logic to control the positioning and moving of the head assembly along the primary axis of rotation to calculate in real time the at least one desired radial position of the tool holder relative to the primary axis of rotation as the head assembly is moved along the primary axis of rotation to move in unison the head assembly and the tool holder.

22. The apparatus of claim 20 wherein the secondary control logic uses a programmed rate of change in the radial position of the tool holder relative to the primary axis of rotation to calculate the at least one desired radial position of the tool holder relative to the primary axis of rotation.

23. The apparatus of claim 20 wherein the head assembly carries an electronically readable identification code that allows the head assembly to be distinguished from other head assemblies among a plurality of head assemblies.

24. The apparatus of claim 23 wherein at least part of the secondary control logic a) is located external to the head assembly, b) reads the electronically readable identification code carried by the head assembly, and c) generates an output configured to be used to prevent rotation of any part of the head assembly by the machining center if the electronically readable identification code, when read, is determined to be inappropriate.

25. The apparatus of claim 24 wherein the electronically readable identification code and the output generated by the secondary control logic are used to identify and distinguish a head assembly on which a particular cutting tool has been installed from a plurality of other head assemblies on which different cutting tools have been installed, and to prevent rotation of a head assembly on which an inappropriate cutting tool has been installed.

26. The apparatus of claim 20 wherein the secondary control logic can be programmed with updated information concerning the dimensions of the cutting tool mounted on the head assembly to compensate for wear on the cutting tool arising from use.

27. The apparatus of claim 20 wherein the head assembly includes a servo motor for moving the tool holder radially relative to the primary axis of rotation, and an accelerometer to measure centrifugal force experienced by the head assembly during rotation by the machining center.

28. The apparatus of claim 27 wherein the secondary control logic uses input from the accelerometer to adjust control signals sent to the servo motor to compensate for the effect of the centrifugal forces on the accuracy with which the servo motor positions the tool holder radially with respect to the primary axis of rotation.

29. The apparatus of claim 20 wherein the head assembly includes a rotary encoder to monitor the operation of the servo motor, and a linear encoder to monitor the position of the tool holder radially with respect to the primary axis of rotation.

30. The apparatus of claim 29 wherein the secondary control logic uses input from both the linear encoder and the rotary encoder to adjust control signals sent to the servo motor to increase the accuracy with which the servo motor positions the tool holder radially with respect to the primary axis of rotation.

31. The apparatus of claim 20 wherein the head assembly is designed to be handled by automatic tool changers commonly used with machining centers.

32. A boring and contouring head assembly for use in a machining center, comprising:
   a) structure adapted to be connected to a spindle of the machining center for being rotated by the spindle about a primary axis of rotation;
   b) a cutting tool holder supported by the structure for moving transversely relative to the structure to alter a radial offset distance of a cutting tool carried by the tool holder relative to the primary axis of rotation,
   c) a feed device coupled to the spindle for translating along the primary axis of rotation the spindle, the structure, the tool holder and the cutting tool;
   d) a primary control logic connected to the feed device for providing a primary control signal for controlling the translation by the feed device along the primary axis of rotation of the spindle, the structure, the tool holder and the cutting tool;
   e) a drive device coupled to the structure and to the cutting tool holder for moving transversely relative to the primary axis of rotation the tool holder and the cutting tool; and,
   f) a secondary control logic mounted at least in part to the structure and connected to the drive device for providing a secondary control signal for controlling the transverse movement of the tool holder and the cutting tool by the drive device in response to translation along the primary axis of rotation of the cutting tool and in response to a program of instruction provided to the secondary logic that defines desired radial offset distances of the cutting tool that correspond to positions along the primary axis of rotation to which the cutting tool is translated by the feed device so that the cutting tool is positioned to engage a workpiece and to machine a desired contour on the workpiece while the cutting tool is being rotated about the primary axis of rotation by the spindle, while the tool holder is being translated along the primary axis of rotation by the feed device, and while the cutting tool is being transversely positioned relative to the primary axis of rotation by the drive device.

33. The head assembly of claim 32 wherein a second part of the secondary control logic is located at a distance spaced from the structure, and the combination additionally includes means for establishing communication between the first and second parts of the secondary control logic.

34. The head assembly of claim 32 wherein the drive device includes a servo motor carried by the structure, and drive components that couple an output shaft of the servo motor to the tool holder for radially positioning the tool holder relative to the primary axis of rotation.

35. The head assembly of claim 34 wherein the drive components include a speed reducer for diminishing the speed of rotation of the output shaft of the servo motor, and a lead screw rotated by the speed reducer and threaded into a nut that is connected to the tool holder.

36. The head assembly of claim 35 additionally including a tool slide that is moved by the lead screw radially in response to rotation of the lead screw, wherein the tool holder is removably attached to the tool slide for movement therewith.

37. The head assembly of claim 32 wherein at least a part of the secondary control logic is carried on a printed circuit board connected to and protectively enclosed by the structure.

38. The head assembly of claim 32 additionally including elements for moving in a directions opposite to the directions of movement of the tool holder to at least partially counteract such dynamic imbalance as may be caused to the head assembly by the radial positioning relative to the primary axis of rotation of the tool holder.

39. A boring and contouring head assembly for attachment to the spindle of a machining center for being rotated about a primary axis of rotation by the spindle, comprising:
   tubular drive structure extending along the primary axis of rotation for rotating a body connected to the structure and located along the primary axis of rotation at a distance spaced from the spindle,
   a tool holder connected to the body for movement radially relative to the primary axis of rotation, and,
   a drive device connected to the structure and to the body for being rotated together with the structure and the body about the primary axis of rotation, and for being operated to move the tool holder radially relative to the primary axis of rotation while the structure and the body are being rotated about the primary axis of rotation by the spindle,
   wherein the drive device includes a servo motor that is protectively housed and mounted within the tubular drive structure and has an output shaft that extends along the principal axis of rotation, and
   wherein further the drive device includes drive components that drivingly connect the output shaft of the servo motor to enable operation of the servo motor to effect radial movement of the tool holder relative to the primary axis of rotation.

40. The head assembly of claim 39 wherein the drive components include a speed reducer that also is protectively housed within the tubular drive structure, that has an input connected to the drive shaft of the servo motor, that has an output connected to another of the drive components, and wherein the input and the output of the speed reducer align with and extend along the primary axis of rotation.

41. The head assembly of claim 39 additionally including control logic connected to the servo motor for operating the servo motor, with the control logic being carried at least in part on at least one circuit board that is protectively housed by the the tubular drive structure.

* * * * *